United States Patent
Lavallee

(10) Patent No.: US 9,032,292 B2
(45) Date of Patent: May 12, 2015

(54) SIMULTANEOUS DISPLAY OF MULTIPLE MAXIMIZED APPLICATIONS ON TOUCH SCREEN ELECTRONIC DEVICES

(75) Inventor: Joshua John Lavallee, Breslau (CA)

(73) Assignee: BlackBerry Limited, Waterloo, Ontario (CA)

( * ) Notice: Subject to any disclaimer, the term of this patent is extended or adjusted under 35 U.S.C. 154(b) by 179 days.

(21) Appl. No.: 13/353,505

(22) Filed: Jan. 19, 2012

(65) Prior Publication Data

US 2013/0187861 A1 Jul. 25, 2013

(51) Int. Cl.
G06F 3/01 (2006.01)
G06F 3/0481 (2013.01)
G06F 9/54 (2006.01)
G06F 3/0486 (2013.01)

(52) U.S. Cl.
CPC .......... *G06F 3/04817* (2013.01); *G06F 3/0481* (2013.01); *G06F 9/543* (2013.01); *G06F 3/0486* (2013.01); *G06F 2200/1637* (2013.01); *G06F 2203/04803* (2013.01)

(58) Field of Classification Search
CPC .................................................. G06F 3/0481
USPC ...................... 345/173–178; 178/18.01–20.04
See application file for complete search history.

(56) References Cited

U.S. PATENT DOCUMENTS

| | | |
|---|---|---|
| 7,019,714 B2 | 3/2006 | Uchida et al. |
| 7,549,961 B1 | 6/2009 | Hwang |
| 2004/0160383 A1 | 8/2004 | Wen |
| 2004/0207569 A1 | 10/2004 | Ho et al. |
| 2005/0140566 A1 | 6/2005 | Kim et al. |
| 2006/0224989 A1 | 10/2006 | Pettiross et al. |
| 2007/0120763 A1 | 5/2007 | De Paepe et al. |
| 2010/0138763 A1* | 6/2010 | Kim .............................. 715/765 |
| 2010/0248788 A1* | 9/2010 | Yook et al. .................... 455/566 |
| 2010/0315315 A1 | 12/2010 | Osborne |
| 2011/0128346 A1 | 6/2011 | Pham et al. |
| 2011/0246926 A1 | 10/2011 | Newton |
| 2013/0080932 A1* | 3/2013 | Sirpal et al. ................... 715/761 |

FOREIGN PATENT DOCUMENTS

| | | |
|---|---|---|
| EP | 2136290 | 12/2009 |
| EP | 2293533 | 3/2011 |

OTHER PUBLICATIONS

EPO, Extended European Search Report, EP Appl. 12151825.2, Jun. 22, 2012.

* cited by examiner

*Primary Examiner* — Quan-Zhen Wang
*Assistant Examiner* — Chad Dicke
(74) *Attorney, Agent, or Firm* — Fleit Gibbons Gutman Bongini & Bianco P.L.

(57) ABSTRACT

The present disclosure provides for a touch screen electronic device to display two or more running applications simultaneously in a side-by-side layout in a split screen mode of the device. Two or more applications that are running on an operating system of the device can be easily displayed simultaneously in the split screen mode while maintaining one of the displayed applications as active so that the user can provide user inputs to the active application.

28 Claims, 19 Drawing Sheets

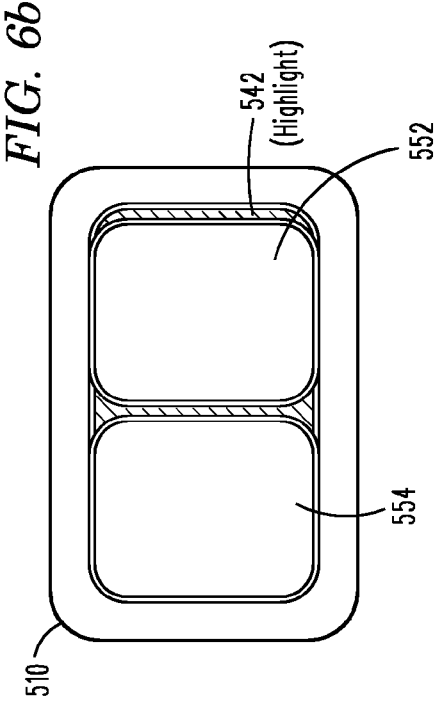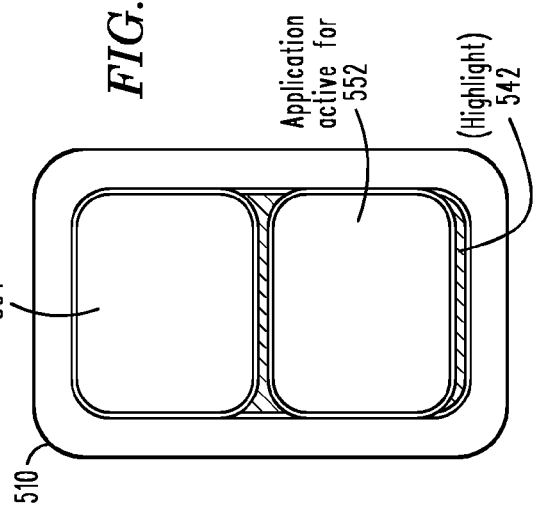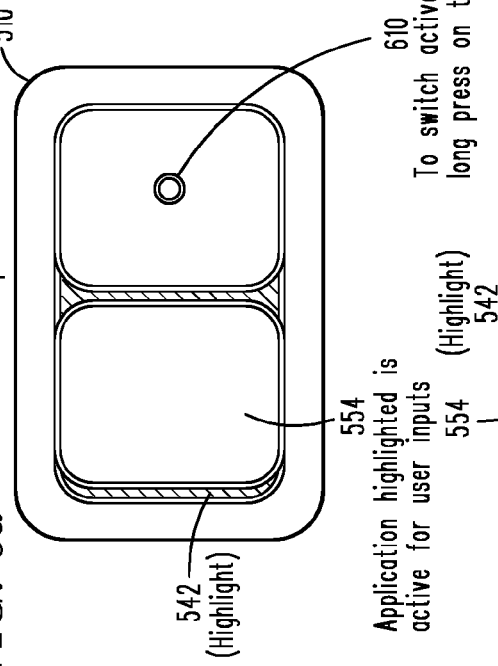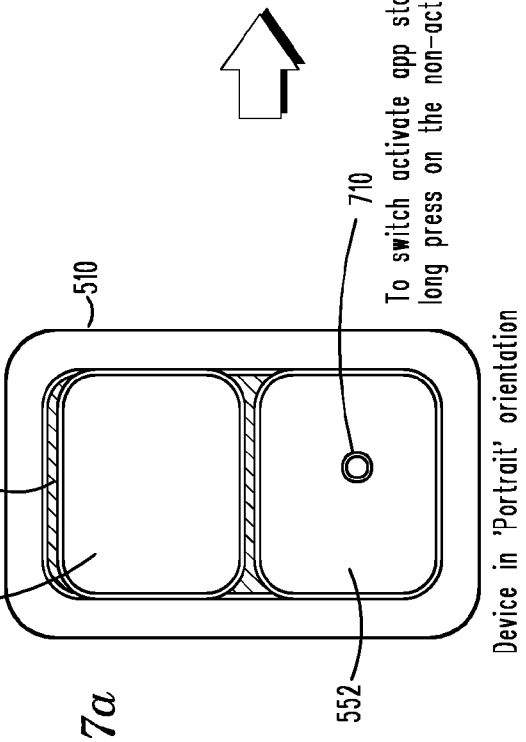

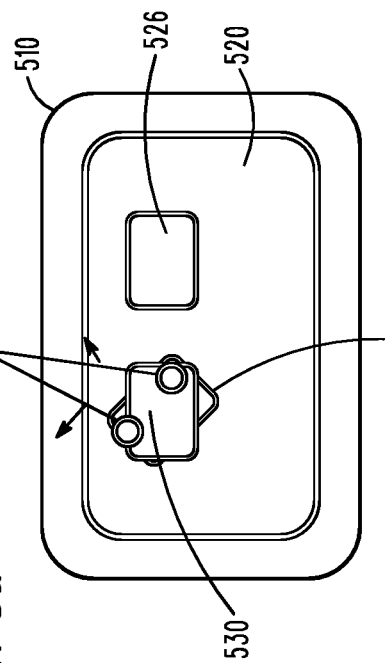
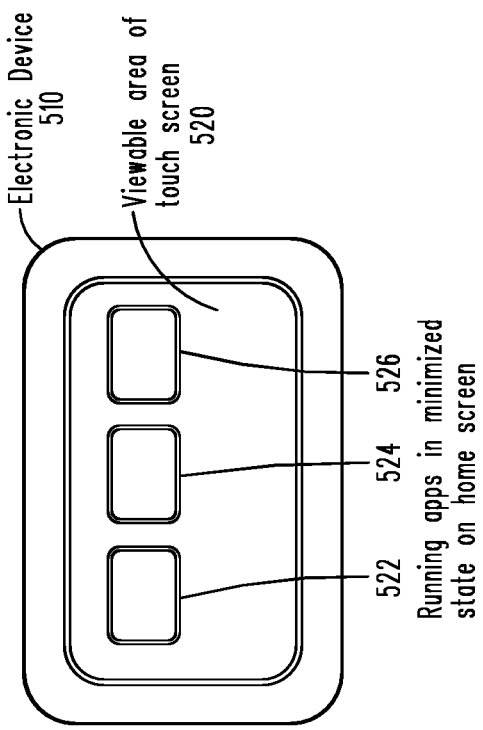
FIG. 8a
FIG. 8b

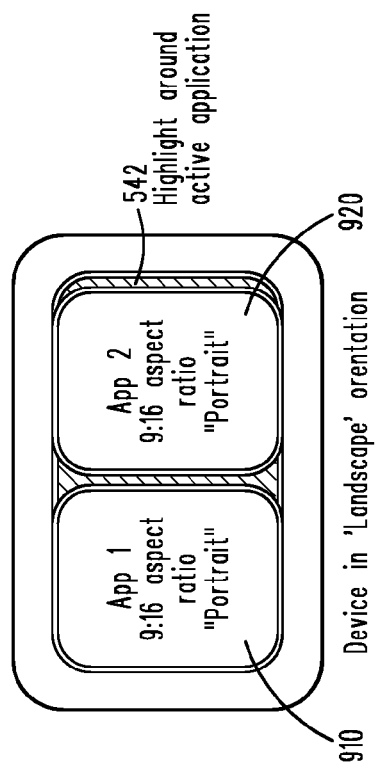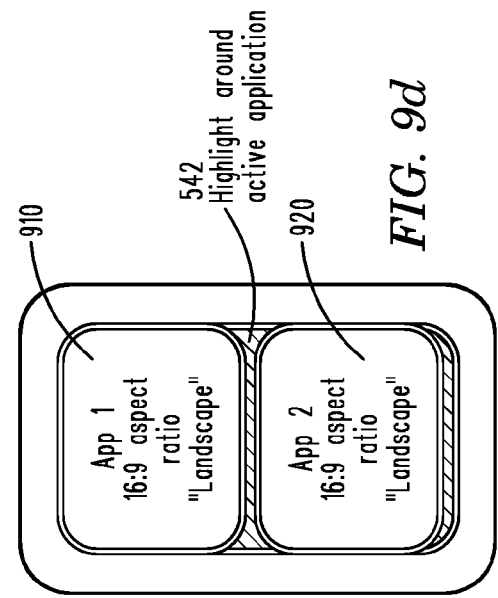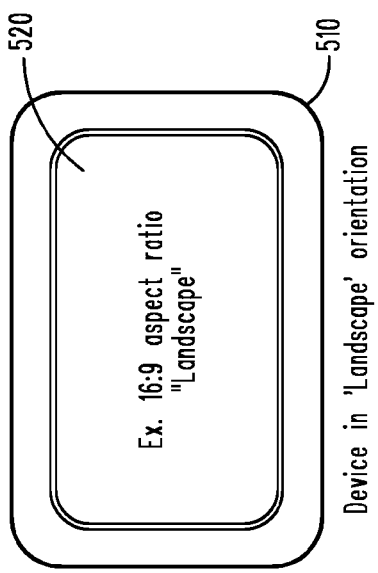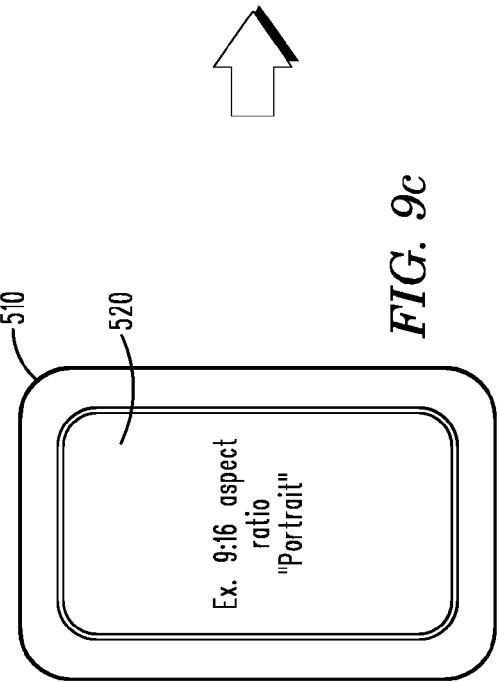

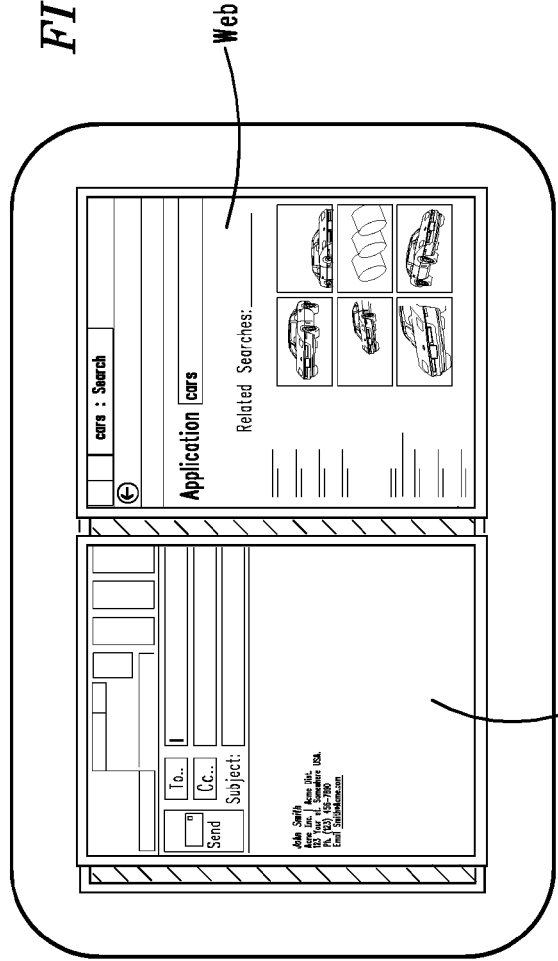
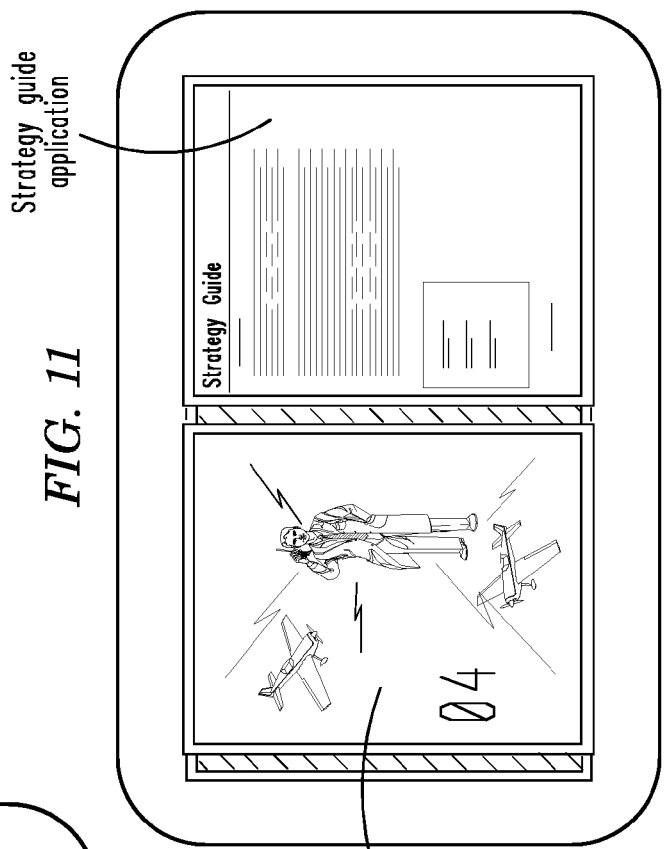
FIG. 10
FIG. 11

Release picture in desired location 1230

Drag picture into email window 1220

Release picture in desired location 1330

Drag picture into presentation window 1320

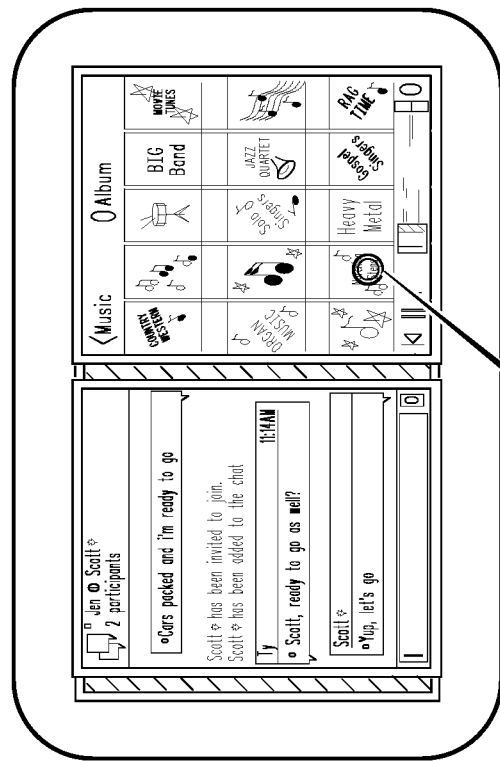
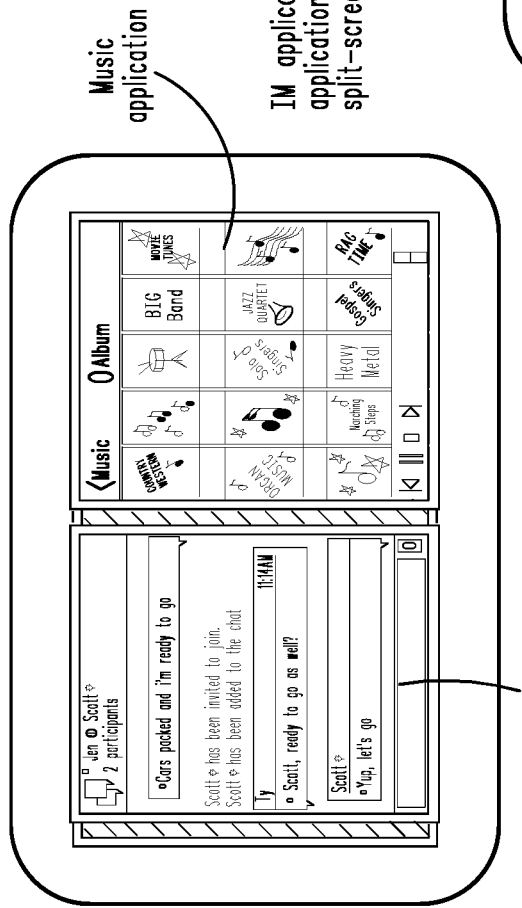
FIG. 14a
FIG. 14b

Drag song into email window 1420

Release song into conversation to send to friend 1430

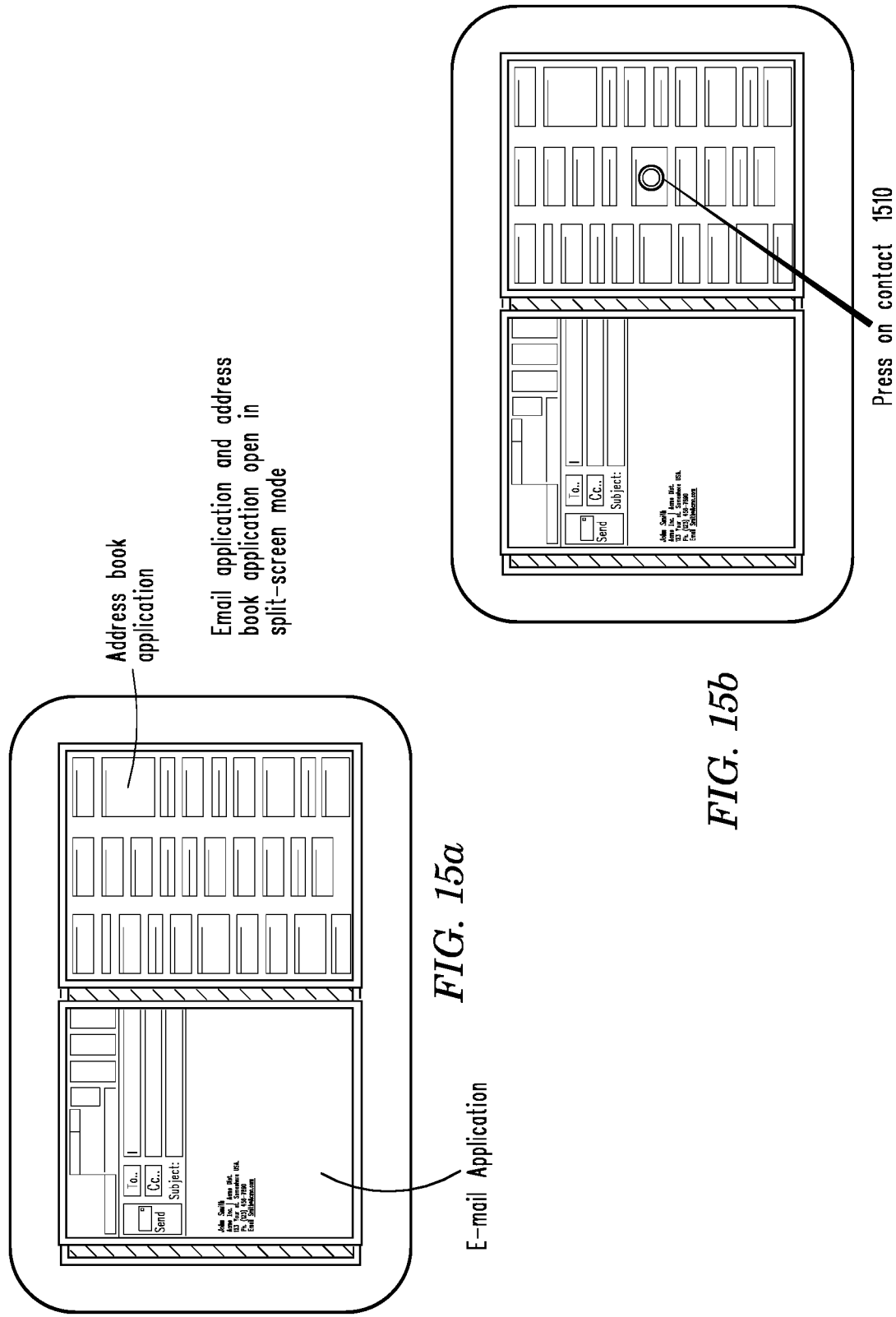

Drag contact into email window 1520

Release contact in desired location 1530

SIMULTANEOUS DISPLAY OF MULTIPLE MAXIMIZED APPLICATIONS ON TOUCH SCREEN ELECTRONIC DEVICES

TECHNICAL FIELD

The present disclosure relates to a method for displaying maximized applications simultaneously on a touch screen of a mobile electronic device.

BACKGROUND

When using a mobile electronic device to running various applications, one application is generally in full screen mode and maximized and displayed on the full screen, while the remaining open applications may run in the background. This scenario is considered multi-tasking, and shortcuts may allow the user to quickly jump between various running applications or "apps." However, a user of the electronic device with a touch screen can only interact with and view one application at any given time in full screen mode. There is not a user interface or method that allows two applications to be displayed simultaneously on a mobile electronic device touch screen.

Electronic devices, including mobile electronic devices, with full touch screens have a constant touch screen size and resolution that equates to a specific aspect ratio of the viewable area of the touch screen. This aspect ratio is used in application software coding to allow an application to be optimized for the full screen experience. In order to display two applications simultaneously in a split screen mode, the two applications would have to share the touch screen's viewable area, resulting in a different aspect ratio. Since applications are coded based on aspect ratio, developers would have to reprogram their applications to allow multiple viewable area states to account for when an application is in full screen mode and for when the application is in split screen mode. A way to display multiple applications simultaneously on a touch screen of a mobile electronic device would be advantageous.

BRIEF DESCRIPTION OF THE DRAWINGS

Example embodiments of the present disclosure will be described below with reference to the included drawings such that like reference numerals refer to like elements and in which:

FIGS. 6a-6b and 7a-7b illustrate switching the active running application, in accordance with various aspects of the present disclosure.

FIGS. 8a-8b illustrate ungrouping of a combined group representation, in accordance with various aspects of the present disclosure.

FIGS. 9a-d illustrate the aspect ratio of a touch screen vis-à-vis two resulting split screen mode viewing areas of the touch screen, in accordance with various aspects of the present disclosure.

FIGS. 10 and 11 illustrate examples of maximized and displayed running applications in the split screen mode, in accordance with various aspects of the present disclosure.

FIGS. 12a-d, 13a-d, 14a-d, and 15a-d illustrate examples of the share functionality between two or more running applications, in accordance with aspects of the present disclosure.

DETAILED DESCRIPTION

Figure 1:
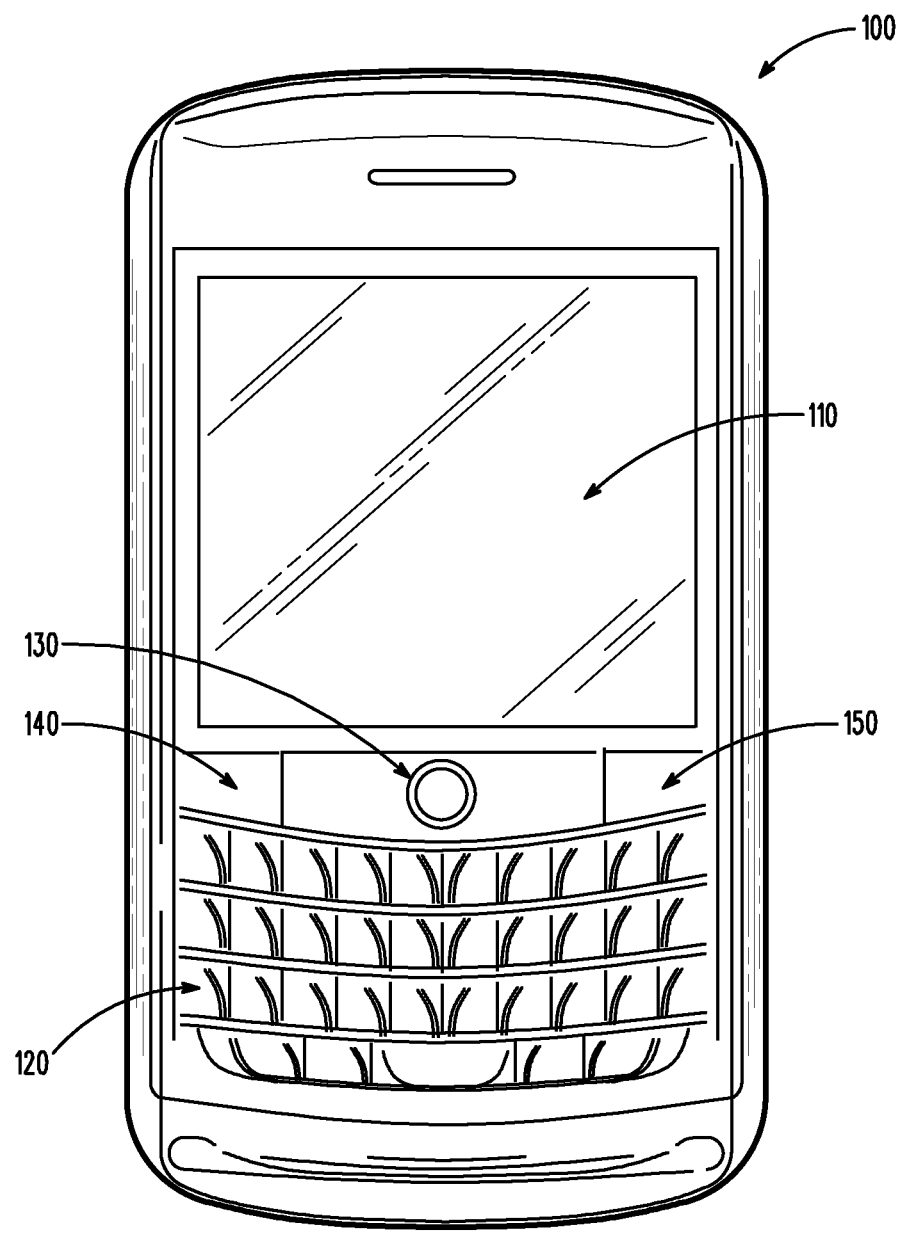
FIG. 1 is a front view of a mobile electronic device, in accordance with various aspects of the present disclosure.

The various examples presented herein outline methods, user interfaces, and electronic devices that allow a touch screen electronic device to display two or more running applications simultaneously in a side-by-side layout in a split screen mode. Two or more applications that are running on an operating system of the device can be easily displayed simultaneously in the split screen mode while maintaining one of the displayed applications as active so that the user can continue to provide user inputs to the active application. The active status may be easily switched from one of the displayed running applications to another of the displayed running applications. This displaying is implemented in a way that does not require application developers to rewrite their application software to account for the multiple view states of a full screen mode and a split screen mode.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

Therefore, in accordance with certain aspects of the present disclosure, there is provided a method of displaying maximized applications simultaneously on a touch screen of an electronic device, comprising: creating a combined group representation representative of two or more running applications, wherein the combined group representation comprises two or more application representations that are grouped and displayed on a viewable area of the touch screen and wherein the two or more application representations correspond to minimized states of display of the two or more running applications; and in response to selection of the combined group representation, entering a split screen mode and in the split screen mode opening and simultaneously displaying in the viewable area of the touch screen the two or more running applications, wherein a running application of the two or more running applications opened and simultaneously displayed is active and capable of receiving user inputs.

In accordance with another aspect of the present disclosure, there is provided an electronic device, comprising: a touch-sensitive touch screen; a processor coupled to the touch screen; a memory coupled to and in cooperative arrangement with the processor, the processor and the memory configured to: create a combined group representation of two or more application representations representative of two or more running applications in response to the two or more application representations being grouped together on the touch screen, wherein the two or more application representations correspond to minimized states of display of the two or more running applications; and in response to selection of the combined group representation, enter a split screen mode of the electronic device in which the two or more running applications are opened and simultaneously displayed in the viewable area of the touch screen, wherein a running application of the two or more displayed running applications is active and capable of receiving user inputs.

In accordance with still further aspects of the present disclosure, there is provided a non-transitory computer-readable medium having computer-executable instructions for displaying maximized applications simultaneously on a touch screen of an electronic device, comprising: creating a combined group representation representative of two or more running applications, wherein the combined group representation comprises two or more application representations that are grouped and displayed on a viewable area of the touch screen and wherein the two or more application representations correspond to minimized states of display of the two or more running applications; and in response to selection of the combined group representation, entering a split screen mode and in the split screen mode opening and simultaneously displaying in the viewable area of the touch screen the two or more running applications, wherein a running application of the two or more running applications opened and simultaneously displayed is active and capable of receiving user inputs.

FIG. 1 is an illustration of an example electronic device 100 in accordance with aspects of the present disclosure. Electronic device 100 may be a mobile or portable device with a touch-sensitive touch screen. Examples of such electronic devices include mobile phones, cellular phones, smart phones, personal digital assistants (PDAs), digital cameras, wireless organizers, wirelessly enabled notebook computers, tablet computing devices, handheld electronic gaming devices, digital photograph albums, and the like. Electronic device 100 has a touch screen 110 for displaying information, and may also have a keyboard 120 for entering information such as composing email messages, and a pointing device 130 such as a trackball, track wheel, touchpad, and the like, for navigating through items on screen 110. Navigation keys 140 and 150 may be used for navigating content. In some examples, display 110 is a touch screen and the plurality of keys and/or keyboard are soft keys or icons displayed on display 110 and actuated by a human finger or a stylus.

Figure 2:
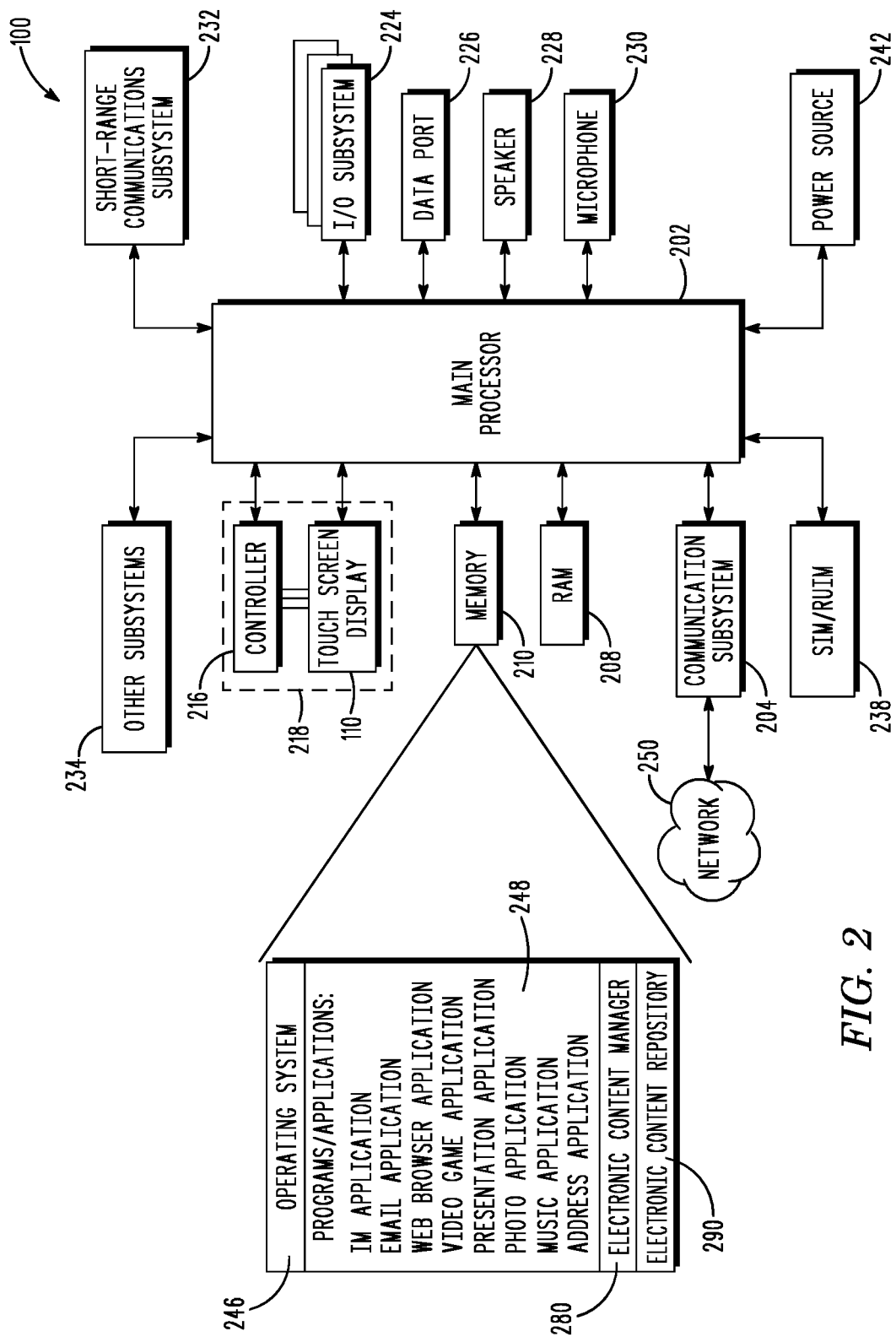
FIG. 2 is a block diagram of an example functional representation of the electronic device of FIG. 1, in accordance with certain aspects of the present disclosure.

FIG. 2 is a block diagram of an example functional representation of the electronic device 100 of FIG. 1, in accordance with certain aspects of the present disclosure. Electronic device 100 includes multiple components, such as a processor 202 that controls the overall operation of electronic device 100. Communication functions, including data and voice communications, are performed through a communication subsystem 204. Communication subsystem 204 receives data from and sends data to a network 250, such as a wide area network, in long-range communication. An example of the data sent or received by the communication subsystem includes but is not limited to email messages, short messaging service (SMS), instant messages, web content, and other electronic content. The wireless network 250 is, for example, a cellular network. In some examples, network 250 is a WIMAX network, a wireless local area network (WLAN) connected to the Internet, or any other suitable communications network. In other examples, other wireless networks are contemplated, including, but not limited to, data wireless networks, voice wireless networks, and networks that support both voice and data communications.

A power source 242, such as one or more rechargeable batteries, a port to an external power supply, a fuel cell, or a solar cell, powers electronic device 100.

The processor 202 interacts with other functional components, such as Random Access Memory (RAM) 208, memory 210, a touch screen 110 (such as, for example, a LCD) which is operatively connected to an electronic controller 216 so that together they comprise a display subsystem 218, an input/output (I/O) subsystem 224, a data port 226, a speaker 228, a microphone 230, short-range communications subsystem 232, and other subsystems 234. It will be appreciated that the electronic controller 216 of the display subsystem 218 need not be physically integrated with the touch screen 110.

The auxiliary I/O subsystems 224 could include input devices other than the touch screen if desired, such as one or more control keys, a keyboard or keypad, navigational tool (input device), or both. The navigational tool could be a clickable/depressible trackball or scroll wheel, or touchpad. User-interaction with a graphical user interface is performed through the I/O subsystem 224.

Electronic device 100 also includes one or more clocks including a system clock (not shown) and sleep clock (not shown). In other examples, a single clock operates as both system clock and sleep clock. The sleep clock is a lower power, lower frequency clock.

To identify a subscriber for network access, electronic device 100 uses a Subscriber Identity Module or a Removable User Identity Module (SIM/RUIM) card 238 for communication with a network, such as the wireless network 250. Alternatively, user identification information is programmed into memory 210.

Electronic device 100 includes an operating system 246 and software programs, subroutines or components 248 that are executed by the processor 202 and are typically stored in a persistent, updatable store such as the memory 210. In some examples, software programs or applications 248 include, for example, personal information management application; communications applications such as Instant Messaging (IM), presentation and email applications; messaging applications; video game applications; web browser applications; photo applications; address applications; music applications; and the like. As will be described further below, such applications may be represented by a representative icon or image. Additional applications or programs can be loaded onto electronic device 100 through data port 226, for example. In some examples, programs are loaded over the wireless network 250, the auxiliary I/O subsystem 224, the short-range communications subsystem 232, or any other suitable subsystem 234.

An electronic content manager 280 is included in memory 210 of device 100. Electronic content manager 280 enables device 100 to fetch, download, send, receive, and display electronic content as will be described in detail below.

An electronic content repository 290 is also included in memory 210 of device 100. The electronic content repository or database, 290 stores electronic content such as electronic books, videos, music, multimedia, photos, and the like.

Figure 3:
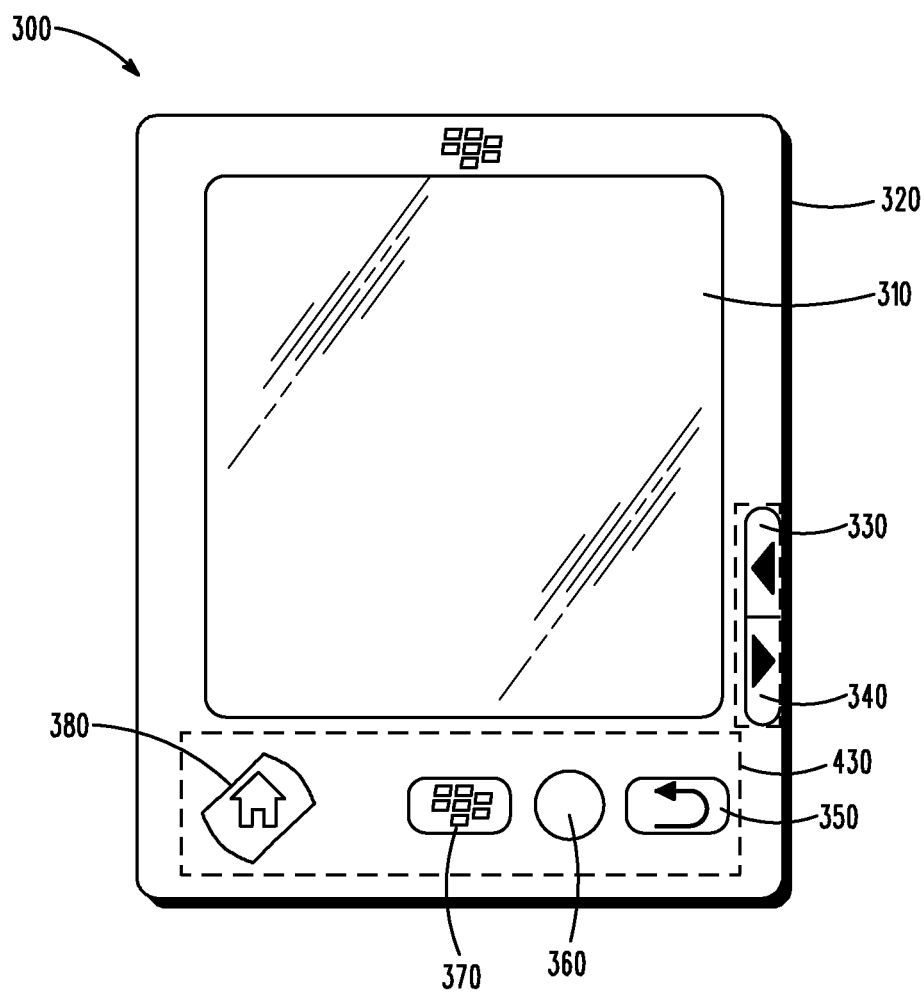
FIG. 3 is a front view of an electronic device having a larger touch screen, in accordance with aspects of the present disclosure.

Referring now to FIG. 3, an illustration of an electronic device 300 having a larger touch screen 310 is presented, in accordance with an example of the present disclosure. The electronic device 300 has a housing 320 which holds a large touch screen display 310 suitable for viewing visual electronic content such as electronic books, photos, videos, and the like. The mobile device 300 includes an input subsystem 430 (indicated within dashed lines in FIG. 3) that in addition to the touch screen display may include keys 330, 340, 350, 360, 370, and 380, located in the housing 320 of the device. For example, menu key 370 is used to cause the electronic device 300 to render on display 310 a graphical user interface (GUI), action key 360 is used to initiate an action by activating an element from the GUI, and escape key 350 is used to cancel the last action performed or return to a previous screen on the GUI. Of course, these keys may be soft keys or icons displayed on touch screen 310 and actuated by a human finger or stylus.

Navigation keys 330 and 340 are used, for example, to navigate forwards and backwards within content viewed on touch screen display 310, respectively. As an example, keys 330 and 340 are used to flip pages when viewing an electronic book, to navigate to a different scene in video content, or to select a different audio track to play. The home key 380 causes the mobile electronic device 300 to render on touch screen display 310 a default home screen (not shown). Electronic device 300 also comprises a speaker (not shown) for playing back audio content, the audio component of video content, or audio produced by text-to-speech of text content, multimedia, and the like.

In various aspects of the disclosure, touch screen 310 serves as a display and an interface between a user and the device 300. Touch screen 310 and the plurality of keys 330, 340, 350, 360, 370, and 380 may be soft keys or icons displayed on touch screen display 310 and actuated by a human finger or a stylus.

Figure 4:
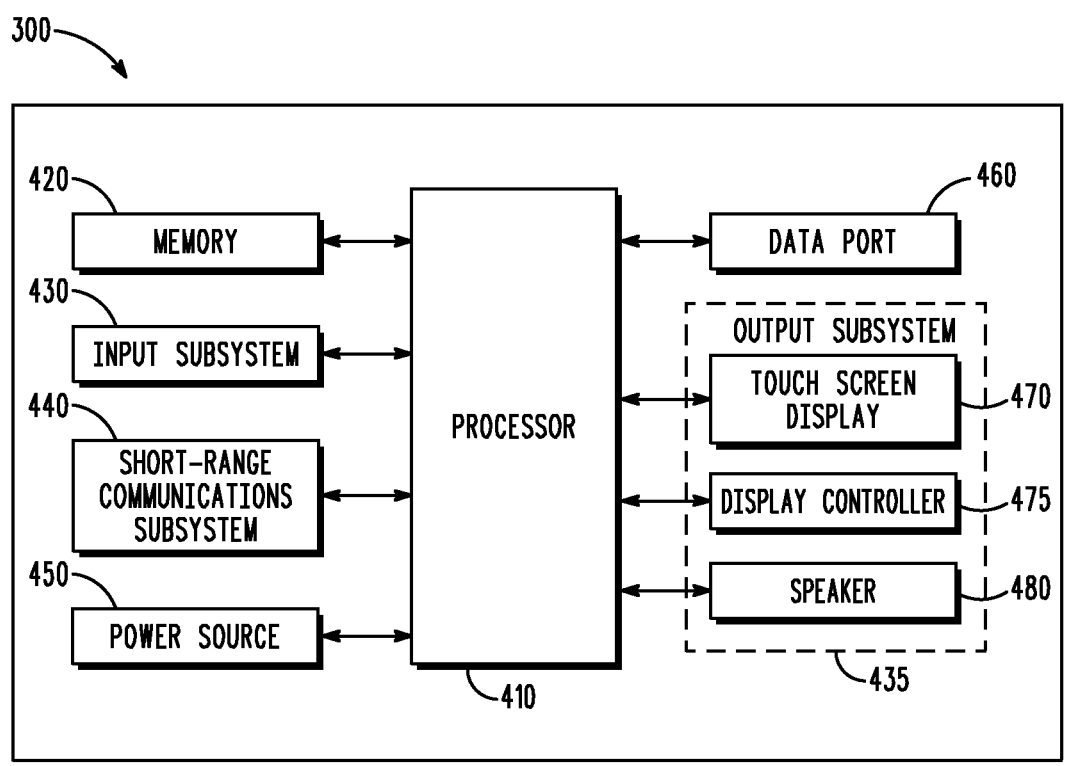
FIG. 4 is a block diagram of an example functional representation of the electronic device of FIG. 3, in accordance with certain aspects of the present disclosure.

FIG. 4 provides an example functional representation of electronic device 300. Additionally, FIG. 4 may provide an alternate example of a block diagram representation of the electronic device 300 of FIG. 3. As shown in FIG. 4, electronic device 300 has a processor 410 that controls the overall operation of the electronic device 300. Short-range communications subsystem 440, such as a BLUETOOTH® subsystem, is coupled to processor 410 provides short-range communications capability used for sending and receiving electronic content at mobile electronic device 300. A data port 460, such as a Universal Serial Bus (USB) port, is used for sending and receiving electronic content at mobile electronic device 300.

Memory 420 may be a Flash memory chip and contains an operating system and other software modules subroutines utilized by processor 410 to operate electronic device 300. Memory 420 also contains modules for carrying out the methods of the present disclosure, as will be described below. Software programs or applications that may reside in memory 420 may include personal information management applications; communications applications such as Instant Messaging (IM), presentation and email applications; messaging applications; video game applications; web browser applications; photo applications; address applications; music applications; and the like. As will be described further below, such applications may be represented by a representative icon or image. Additional applications or programs can be loaded onto electronic device 300 through data port 460, for example.

Electronic device 300 also includes an input subsystem 430 for controlling the device, navigating through content, selecting content to playback, and the like. Input subsystem 430 may also include, for example, keys 330, 340, 350, 360, 370, and 380, described above. Input subsystem 430 may comprise a touchpad, a trackball, a roller wheel, a touch screen with or without a stylus, or any other suitable input device.

A power source 450, such as a battery, is used to power up the processor 410, memory 420, and other subsystems on electronic device 300. In some examples, power source 450 is a power supply connector, a fuel cell, a solar cell, or any other suitable power source.

Touch screen 310 of output subsystem 435 may be, for example, a liquid crystal display (LCD) coupled to processor 410 and displays electronic content as described above. Touch screen display 310 may be a light emitting diode (LED) display, a plasma display, an electronic ink display (e-ink), a Thin Film Transistor (TFT) LCD, or any other suitable display type. Operation of touch screen display 310 is controlled by display controller 475. Touch screen display 470 corresponds to touch screen 310 of FIG. 3 and is controlled by display controller 475 as shown.

Electronic device 300 also has speaker 480 for playing back audio content, the audio component of video content, or audio produced by text-to-speech of text content, and the like.

In some examples of the disclosure, short-range communications subsystem 440 is a wireless local area network (WLAN) subsystem, an Infra Red Data Association (IrDA) subsystem, or a ZIGBEE® subsystem. Other short-range communications subsystems would also be apparent to those of skill in the art.

Data port 460 is a serial port according to the RS-232 specifications, an IEEE 1394 FireWire port, an optical connection, a local area network (LAN) connection such as Ethernet, or any other suitable data communications port.

Memory 420 may be a Random Access Memory (RAM), a serial electrically erasable programmable read only memory (SEEPROM), a removable secure digital (SD) card, a removable compact flash card, a USB flash drive, or any other suitable memory module as would be apparent to those of skill in the art.

Figure 5A:
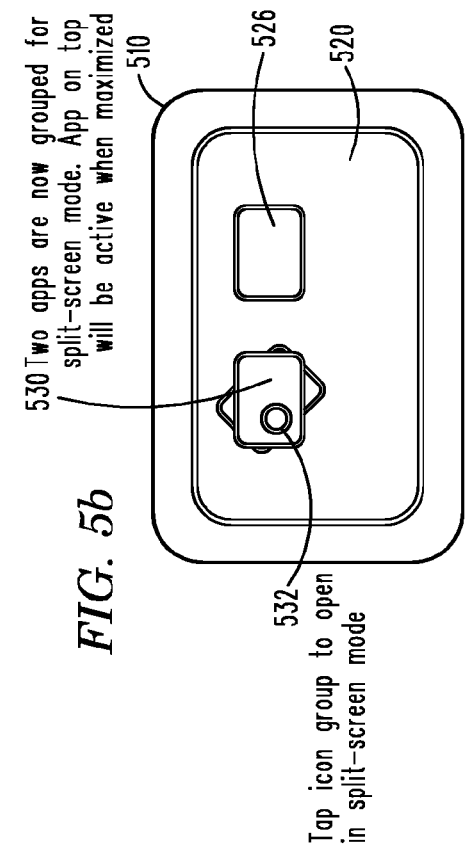
FIGS. 5a-5d illustrate the formation and activation of a combined group representation representative of two or more running applications that are running on the electronic device of FIG. 3, in accordance with various aspects of the present disclosure.

As previously described, software programs or applications, referred to herein as applications, may be running on an electronic device have a touch screen with a viewable area. Such running applications may be represented in the viewable area of the touch screen as icons, screen shots or other minimized state application representations that are not maximized for display within the viewable area. In FIGS. 5a-5d, graphical user interfaces displayed via a viewable area of a touch screen of an electronic device illustrate the formation and activation of a combined group representation representative of two or more running applications that are running on the electronic device. Referring now to FIG. 5a, an electronic device 510 with a viewable area of 520 of a touch screen is shown. There are multiple applications running in the background. The user can use a shortcut or go back to their home screen to get a set of icons, "screen shots", or other application representations that indicate to them all the currently running applications. In this example, three icons or other representations 522, 524, 526 corresponding to minimized states of display of three running applications are shown. As is known, any of the three applications may be selected and maximized by selection of its icon.

Figure 5B:
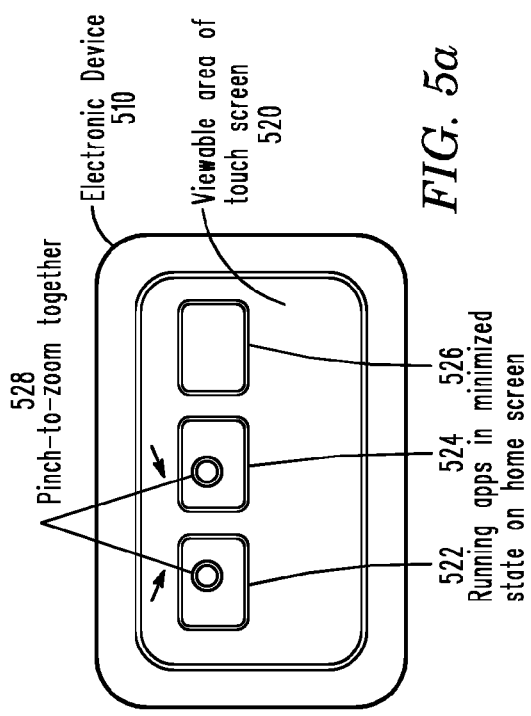

In accordance with the disclosure, a user may group two or more of these application representations to create a combined group representation 530 as shown in FIG. 5b. This can be accomplished by overlaying (pinching) together two or more application icons, or two or more minimized applications (screen shots), e.g., in a ribbon or taskbar. In the example of FIG. 5a, the grouping may be accomplished by overlaying icons 522 and 524 by pinching the icons 522 and 524 together, as indicated by the arrows. A user may place a finger, digit or other appropriate stylus on each of the two icons to be combined 522, 524, as indicated by the circles 528 on icons 522, 524 and the arrows indicating the pinching motion, and dragging them together to accomplish the grouping. This overlaying may also be accomplished by dragging together the two or more application representations so that they are stacked on top of one another. Again, the dragging may be accomplished by using a pinch-to-zoom motion of two or more of a user's fingers, with each finger laid over a running application of the two or more running applications. The created group representation 530 indicates to the user that there are still two applications running designated under the one representation (icon, for example). The combined group representation may be created from a home screen displayed on the touch screen in which the two or more application representations are displayed, though not required. While the combined group representation is formed by grouping together two application representations 522 and 524, it is understand that the combined group representation may be representative of other running applications, so that adding icon 526 to the stack will result in a combined group representation that includes three running applications.

Figure 5D:
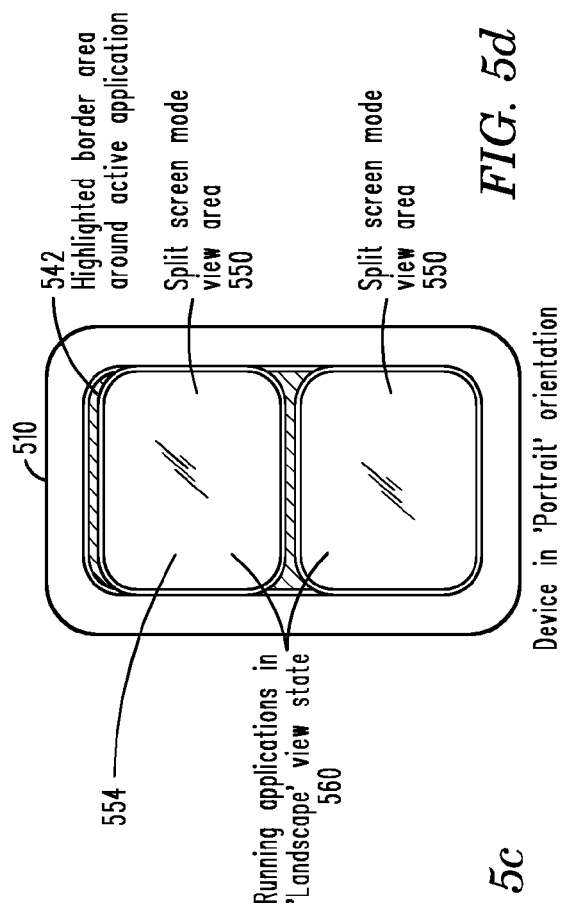
Figure 5C:
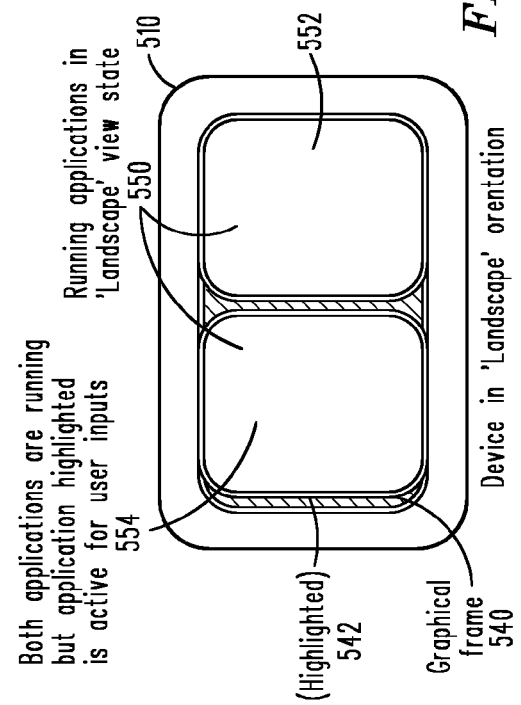

As shown in FIG. 5b, the combined group representation 530 is formed of the two running applications represented by icons 522 and 524; the icons are grouped, such as by stacking as shown here, to form the combined group representation. Once the combined group representation 530 is selected or activated by a user, as indicated by circle 532 representative of a finger, digit or other stylus, the device 510 enters a split screen mode in which each of the running applications represented by the icons of the combined group representation 530 will be maximized (opened) and simultaneously displayed in the viewable area 520 of the touch screen, as shown in FIG. 5c. The user can press the combined group representation 530 on the touch screen, in the same manner they would to select any standard icon, and this action opens both applications in the split screen mode as shown in FIG. 5c. Once the two or more applications are open, one is designated as the active application, meaning it can accept any user inputs from the touch screen, keyboard, mouse or other peripheral. The icon on top of the combined group representation stack 530 is icon 524 in this example, and in accordance with certain examples the running application represented by icon 524 will be the active application when the combined group representation 530 is selected and a split screen mode of the device is entered.

While the combined group representation in this example is formed by grouping together two application representations 522 and 524, it is understand that the combined group representation may be representative of other running applications, so that adding icon 526 to the stack will result in a combined group representation representative of three running applications. Any number of application representations may be grouped to form a combined group representation. Activation of a combined group representation comprised of three or more application representations will cause the three or more running applications represented to be opened and simultaneously displayed in various corresponding split screen mode viewing areas of the viewable area of the touch screen. It is understood that from a practical standpoint, however, that the number of applications to be represented by a combined group representation may be limited by the touch screen size, as it is desired that any maximized and displayed application in the split screen mode will be viewed in a large enough split screen mode viewing area of the viewable area of the touch screen as to be useful.

Electronic devices with full touch screens have a constant touch screen size and resolution that equates to a specific aspect ratio of the viewable area of the touch screen. This aspect ratio is used in application software coding to allow an application to be optimized for the full screen experience. In order to display two or more applications simultaneously in a split screen mode, "simultasking," it is desired that two or more applications are simultaneously displayed without having to reprogram the applications' coding for multiple view states to allow for both full screen mode as well as split screen mode. In accordance with aspects of the disclosure, multiple applications can be simultaneously displayed on a touch screen of an electronic device or singly in a full screen mode without changes to the applications' programming being required.

Electronic device displays, including mobile device displays, are often rectangular in shape with a constant aspect ratio and can be oriented in both "landscape" and "portrait" layouts or orientations. These orientation definitions are used to properly display in a maximized state two or more applications at once without the need for application developers to rework their application(s), effectively allowing the disclosed examples to be used with any application, as application developers of touch screen mode applications develop their applications to be viewed in either landscape or portrait orientation. To accommodate the split screen mode, then, when the device is in a landscape orientation, the running applications of the combined group representation opened in the split screen mode will be simultaneously displayed in portrait state on the touch screen. Conversely, when the device is in a portrait orientation, the running applications of the combined group representation opened in the split screen mode will be simultaneously displayed in landscape state on the touch screen. This is possible due to the common aspect ratios used for touch screen devices, referenced below, and preserves the aspect ratio coded in the applications, thereby avoiding the need for reprogramming. For example, when the viewable area of the touch screen is split in half in order to display two running applications of a combined group representation, the two resulting split screen mode viewing areas of the touch screen in which the two applications will be simultaneously displayed will each have aspect ratios that are close to be converse that of the full touch screen 520. The differences between ratios can be accommodated by the graphical frames used to define and divide the split screen mode viewing areas of the touch screen. Some border area remaining can be used to signify which of the displayed running applications is the active application, as discussed below.

In FIG. 5c, it can be seen that device 510 is in a landscape orientation and that maximized, running applications 552 and 554, corresponding to icons 522 and 524, respectively, are displayed in a portrait orientation in respective split screen mode viewing areas 550, as opposed to the landscape orientation of device 510. Each split screen mode viewing area 550 is defined by a corresponding graphical frame 540. As icon 524 was on top of the stack of combined group representation 530, its maximized application 554 is active and able to accept inputs. The active state of application 554 is indicated by a highlighted portion 542 of the viewable area 520 of the touch screen. Similarly, FIG. 5d shows electronic device 510 in a portrait orientation and the maximized, running applications are shown in a landscape orientation 560 in the split screen mode viewing areas 550. Application 554 is still the active application and its split screen mode viewing area 550 is surrounded by a highlighted portion 542 of the viewable area of the touch screen. The highlighted portion 542 of the viewable area of the touch screen serves to highlight or draw attention to the active state of application 554. In FIGS. 5c and 5d, the highlighted portion 542 occupies the available areas of the viewable area 520 surrounding active application 554, but it is understood that the shape and extent of highlighted portion 542 may be changed as desired, so long as highlighted portion 542 highlights the active state of application 554.

It is noted that in order to display the running, maximized applications 552 and 554 in the touch screen display, the split screen mode viewing areas 550 in which they are simultaneously displayed occupy a substantial majority of the viewable area of the touch screen 520. This allocation allows the display of the maximized applications to be easily viewed by the user. The highlighted portion 542 of the viewable area of the touch screen can be used to fill any remaining area of the viewable area. The exact size of the highlighted portion can vary depending on how many applications are maximized and displayed in the split screen mode of the electronic device 510.

Referring now to FIGS. 6a-b and 7a-b, it can be seen that the active application displayed in the split screen mode can be changed or switched. The active application refers to the application of the maximized, running applications displayed in the split screen mode that is capable of accepting inputs, such as from a user providing inputs via the touch screen 520 of the device 510 or via peripherals, such as a keyboard, mouse, etc., that may be coupled to device 510. Once the two or more running applications are open and simultaneously displayed, one application is designated as active to accept user inputs. Selection of one of the other running, inactive applications, such as by a long press inside the inactive application, will activate that application and cause it to be the active application. In FIG. 6a, mobile device 510 is shown in landscape orientation and applications 552 and 554 are displayed in their respective split screen mode viewing areas in portrait orientation. Application 554 is still active, as indicated by the highlighted portion 542 surrounding the graphical frame that defines its split screen mode viewing area. In order to switch from application 554 to application 552 as the active, running application displayed in the split screen mode, a user may make a long press 610 on the non-active application 552, as shown in the drawing. This selection has the effect, shown in FIG. 6b, of making application 552 the active, running application; highlighted portion 542 now surrounds the split screen mode viewing area in which application 552 is displayed. Thus, switching active control of the two or more running applications from a previous running application as the active application to a new running application as the active application can be accomplished. It has been shown that this switching active control may be accomplished by selecting the new running application to be active via the touch screen. Moreover, the previous running application can be the active application that was designated as active upon creating the combined group representation. In the example of FIGS. 5a-5d, application 554 was the initial active application so designated upon forming the combined group icon 530.

In FIG. 7a, mobile device 510 is shown in portrait orientation and applications 552 and 554 are displayed in their respective split screen mode viewing areas in landscape orientation. Application 554 is still active, as indicated by the highlighted portion 542 surrounding the graphical frame that defines its split screen mode viewing area. In order to switch from application 554 to application 552 as the active, running application displayed in the split screen mode, a user may make a long press 710 on the non-active application 552, as shown in the drawing. This selection has the effect, shown in FIG. 7b, of making application 552 the active, running application; highlighted portion 542 now surrounds the split screen mode viewing area in which application 552 is displayed.

Once in the split screen mode of the touch screen, the split screen mode can be exited in several ways. Returning to the home screen displayed on the viewable area of the touch screen, minimizing to a minimized state of display the two or more running applications, opening and displaying an activate applications switcher in the viewable area of the touch screen, or ungrouping the combined group representation 530 will all have the affect of exiting the split screen mode. Note that exiting the split screen mode does not itself destroy the combined group representation 530, which may still be displayed in the viewable area of touch screen 520 for selection at a future time until such time as the combined group representation 530 is ungrouped.

It may be desired, however, to dismantle or de-group the combined group representation 530. Referring now to FIG. 8a, it can be seen that the combined group representation 530 can be or ungrouped dismantled into its constituent running application representations that correspond to the minimized state of display of the two or more running applications, if desired. Ungrouping the combined group representation comprises separating the two or more application representations corresponding to the two or more running applications so that they are no longer grouped. This ungrouping may be accomplished by pinching the two or more applications icons away from each other, or pinching the two minimized applications (screenshots) away from each other. It is noted that in the case of three or more running applications represented by a combined group representation, separating any two of the running application representations will have the effect of ungrouping the combined group representation without the need to separate all of the running application representations. In the example shown in FIG. 8a, this ungrouping can be accomplished by the user using a pinch-to-zoom away motion with two or more of fingers, with each finger laid over a running application of the two or more running applications, as indicated by reference number 810 and the arrows. Decoupling the combined group representation into its constituent running application representations results in running application representations 522, 524, 526 being displayed in the viewable area of the touch screen as before, shown in FIG. 8b.

As previously mentioned, electronic device displays, including mobile device displays, are often rectangular in shape with a constant aspect ratio and can be oriented in both "landscape" and "portrait" layouts or orientations. These orientation definitions are used to properly display in a maximized state two or more applications at once without the need for application developers to rework their application(s), effectively allowing the disclosed examples to be used with any application, as application developers of touch screen mode applications develop their applications to be viewed in either landscape or portrait orientation. This display method is possible due to the common aspect ratios used for touch screen devices, referenced below. For example, when the viewable area of the touch screen is split in half in order to display two running applications of a combined group representation, the two resulting split screen mode viewing areas of the touch screen in which the two applications will be simultaneously displayed will each have aspect ratios that are close to be converse that of the full touch screen 520. The differences between ratios can be accommodated by the graphical frames used to define and divide the split screen mode viewing areas of the touch screen.

Referring now to FIGS. 9a-d, examples of the aspect ratio of the touch screen vis-à-vis two resulting split screen mode viewing areas of the touch screen are illustrated. FIG. 9a shows an electronic device 510 in a landscape orientation; its touch screen 520 has an aspect ratio of 16:9 for landscape orientation. FIG. 9b illustrates two applications 910 and 920 that have been simultaneously displayed in the split screen mode in a portrait orientation. The aspect ratio of each portrait-oriented split screen mode viewing area in which the application is displayed is the converse that of the landscape-oriented full touch screen, or 9:16. Similarly, FIG. 9c shows electronic device 510 in a portrait orientation; its touch screen 520 has an aspect ratio of 16:9 for portrait orientation. FIG. 9d illustrates two applications 910 and 920 simultaneously displayed in the split screen mode in landscape orientation.

FIGS. 10 and 11, illustrate representative examples of running applications that have been maximized and displayed in their respective split screen mode viewing areas in the split screen mode after the combined group representation in which they are represented has been selected. In FIG. 10, a user of an electronic device with a touch screen is composing an email. Two maximized and displayed running applications are shown: an email application in the left split screen mode viewing area and a web browser application in the right split screen mode viewing area. The split screen mode is used to get content for their email using the web browser. In FIG. 11, a user is playing a video game. Two maximized and displayed running applications are shown: a video game application in the left split screen mode viewing area and a strategy guide application in the right split screen mode viewing area. The split screen mode is used to read the strategy guide for the game while the user is actually playing the video game displayed in the left split screen mode viewing area.

In accordance with yet another aspect of the disclosure, two or more running applications of the combined group representation may have a share function relationship that is formed upon creation of the combined group representation, so that in response to selection of the combined group representation and simultaneous display in the viewable area of the touch screen of the two or more running applications, a share function of the share function relationship permits sharing of items between the two or more running applications thus displayed. The share function may be a copy and paste function that provides for copying one or more items displayed by a first running application of the two or more running applications and pasting the one or more copied items into a second running application of the two or more running applications. The copy and paste function may be accomplished by a drag-and-drop action as will be discussed. Moreover, the share function may be an attach file function that provides for transmitting a file attachment of a first running application of the two or more running applications to a second running application of the two or more running applications; this attach file function could also be accomplished by a drag-and-drop action. Additionally, the share function could be an insert function that provides for inserting one or more items displayed by a first running application into a second running application of the two or more running applications; this insert function could also be accomplished by a drag-and-drop action. Thus, when running applications are grouped in the combined group representation, they can have a special relationship that allows copy and pasting, or transferring items from one "window" or split screen mode viewing area to the other using drag and drop. It is noted that the share function relationship formed between the first and second running applications of the combined group representation may end when the combined group representation is dismantled.

Referring now to FIGS. 12a-d, 13a-d, 14a-d, and 15a-d, various examples of a share function of the share function relationship between two or more running applications resulting from creation of a combined group representation representative of the two or more running applications are illustrated. It has been discussed that when running applications are grouped in the combined group representation, they can have a special relationship, such as a share function relationship, which allows copy and pasting, or transferring items from one "window" or split screen mode viewing area to the other using drag and drop. The share function relationship also allows for an attach file function, as well as an insert function as shown below.

Figure 12A:
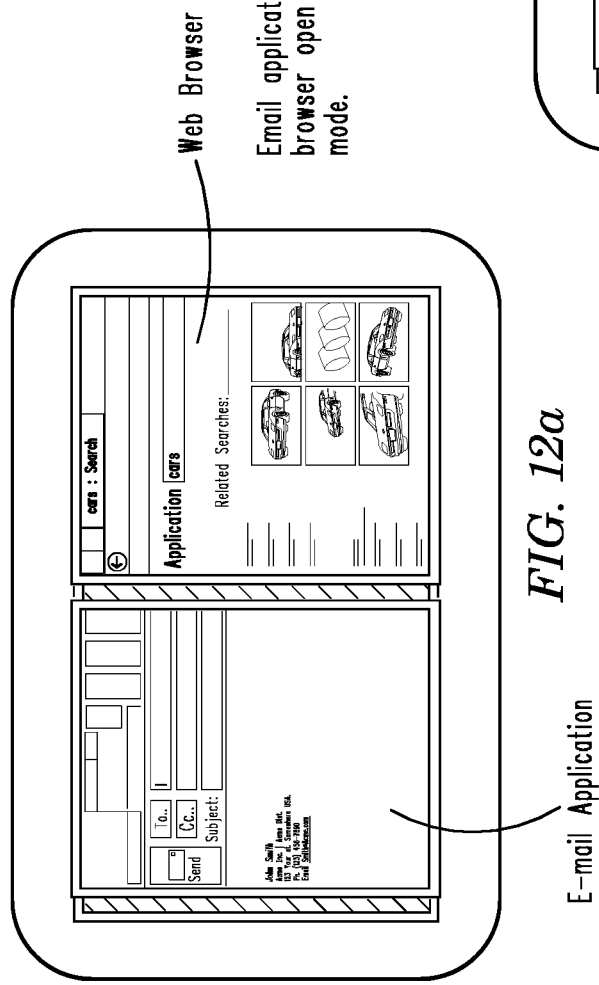
Figure 12B:
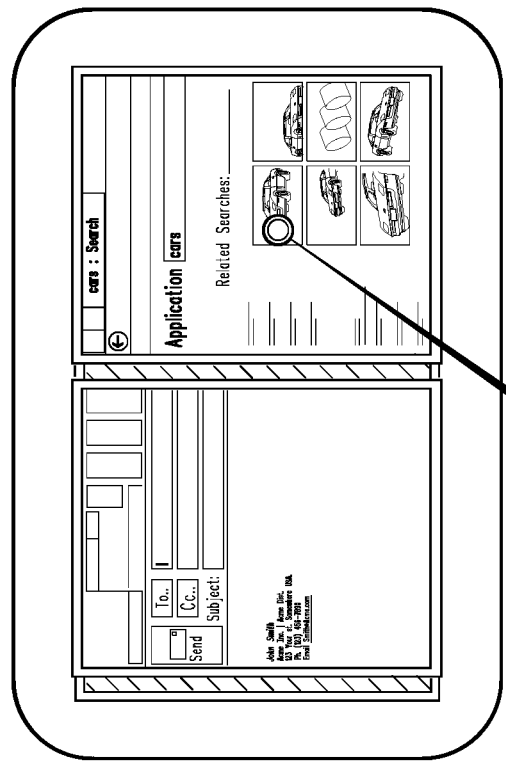
Figure 12D:
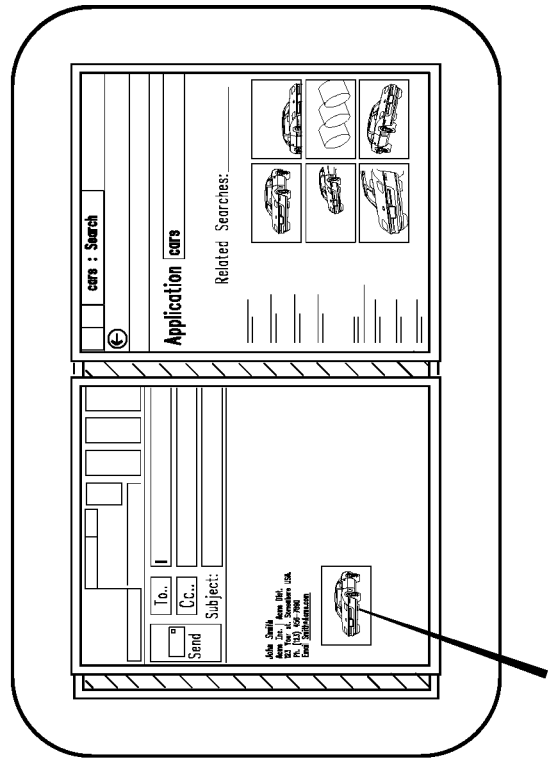
Figure 12C:
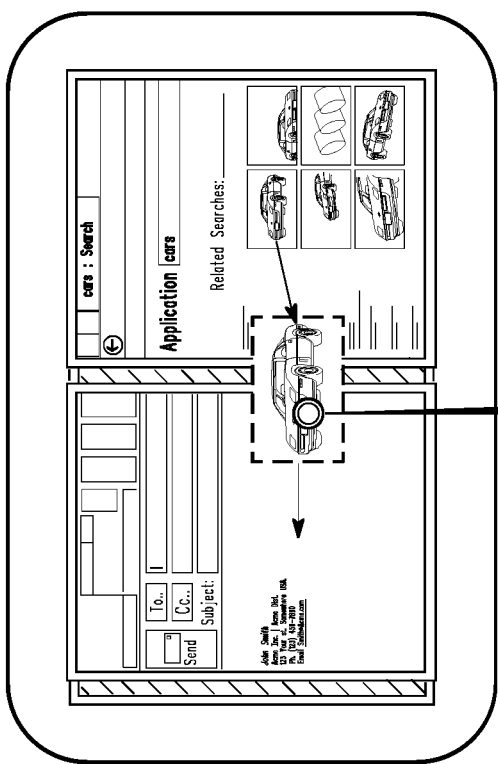

In FIG. 12a, following selection of a combined group representation two maximized and displayed running applications represented in the selected combined group representation are shown: an email application is displayed in the left split screen mode viewing area and a web browser application is displayed in the right split screen mode viewing area. The user in this example is composing an email and is able to use the share function existing between these two running applications while in the split screen mode to drag and drop pictures from the web browser into the email body. This example of a "copy and paste" share function allows a user to copy and paste a picture from the web browser to the email body. In FIG. 12b, the user is able to select an item in the web browser application, in this example a car, as indicated by circle 1210; this selection may be accomplished by a user pressing on the picture of the car on the touch screen. Next, in FIG. 12c, the user can drag the selected picture item from the web browser application displayed in the right split screen mode viewing area over to the left split screen mode viewing area, as indicated by the dashed box 1220 surrounding the selected picture item and the accompanying arrows in FIG. 12c. Finally, in FIG. 12d, the user released the picture item in the desired location of the email application displayed in the left split screen mode viewing area 1230. This release may be accomplished by the user removing his finger from the selected picture item when the picture is in the desired location. In this way, a user of an electronic device can easily drag and drop a selected item from a first running application to a second running application, both simultaneously maximized and displayed in large split screen mode viewing areas of the touch screen of the electronic device. Examples of other items that may be transferred using a copy and paste function include text content, links, as well as the picture or photo in this example.

Figures 13A, 13B:
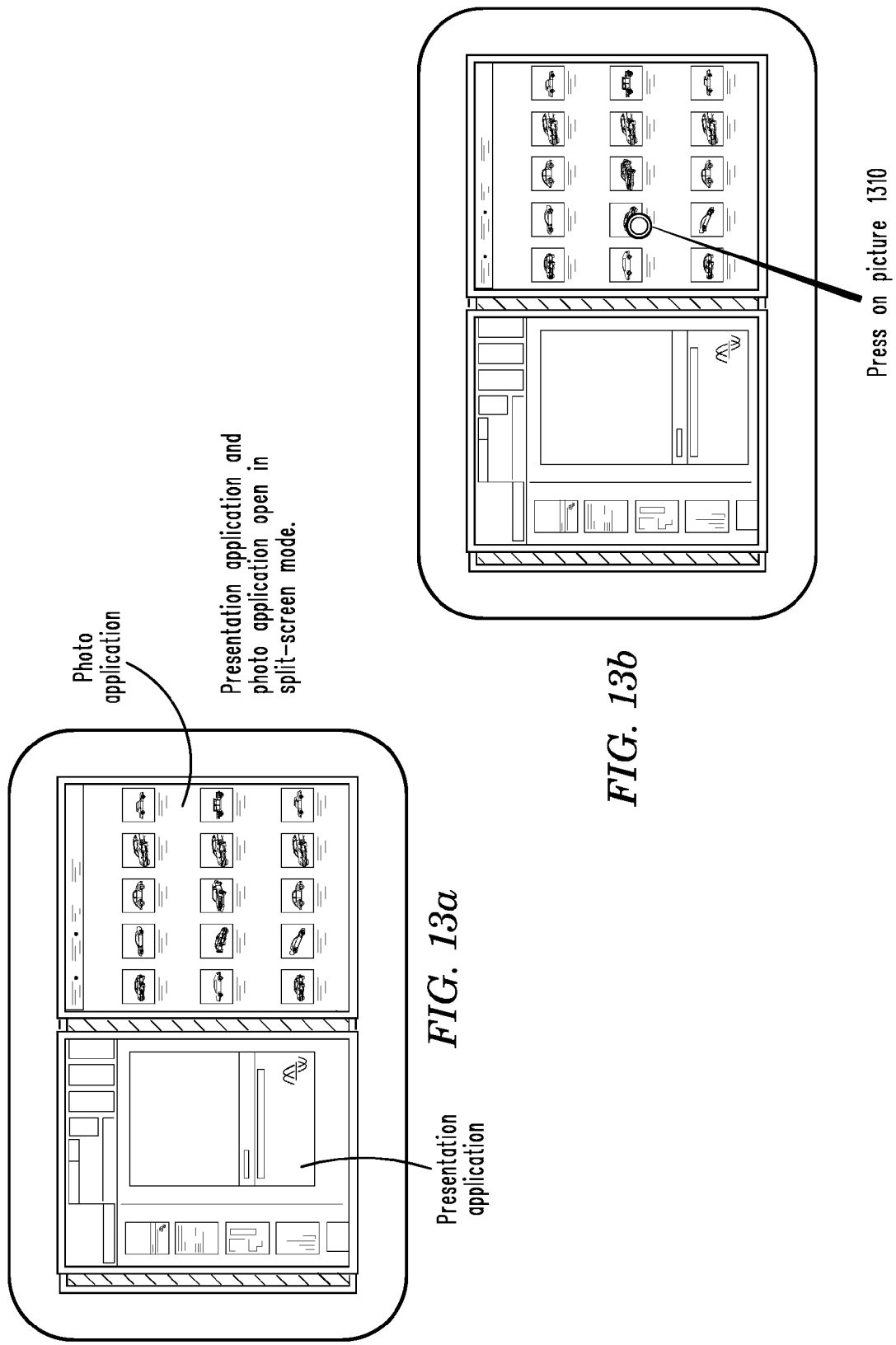
Figure 13D:
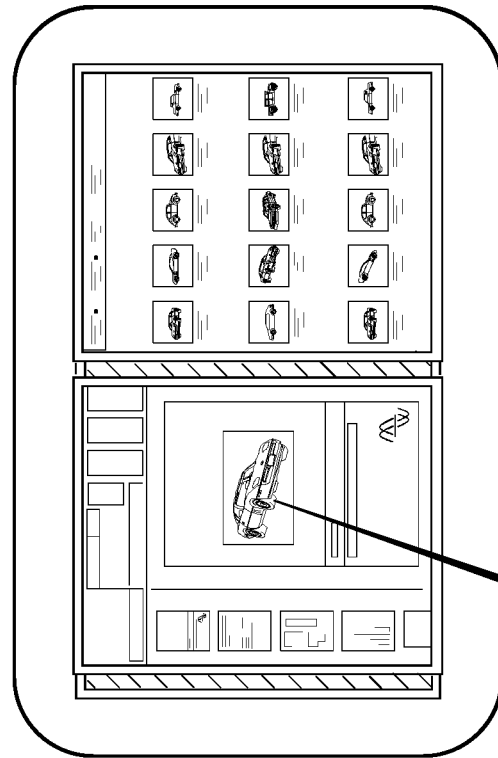
Figure 13C:
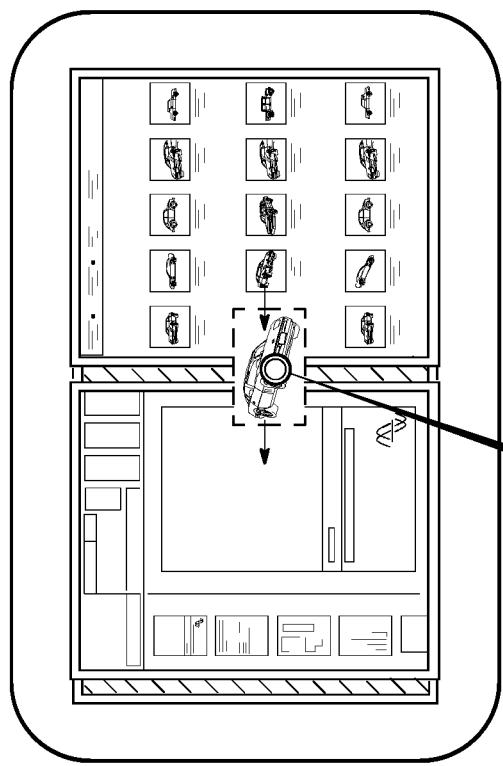

FIGS. 13a-d illustrate that the share function between two or more running applications maximized and simultaneously displayed in split screen mode viewing areas of the touch screen may be an "insert" function that allows items such as pictures, photos, songs, video, locations, contacts, calendar events, etc. to be inserted from a first running application to a second running application. In FIG. 13a, following selection of a combined group representation two maximized and displayed running applications represented in the selected combined group representation are shown: a presentation application, such as POWER POINT®, is displayed in the left split screen mode viewing area and a photo application is displayed in the right split screen mode viewing area. The user in this example is creating a presentation and is able to use the share function existing between these two running applications while in the split screen mode to drag and drop pictures from the photo application into the presentation application. This example of an insert share function allows a user to insert a picture from the photo application into the presentation application. In FIG. 13b, the user presses on the desired picture in the right split screen mode viewing area of the touch screen, as indicated by the circle 1310, to select the picture. Next, in FIG. 13c, the user drags the selected picture into the presentation application in the left split screen mode viewing area of the touch screen, as indicated by the dashed box 1320 surrounded the selected picture and the accompanying arrows in the drawing. The selected picture is dragged in to the presentation application displayed in the left split screen mode viewing area of the touch screen and released in the desired location 1330 in FIG. 13*d*. The item in this application is a stored picture file, such as a file stored on the device, which can be inserted as shown.

It is noted that in the "copy and paste" function of FIG. 12, information available from open applications, though not necessarily stored, may be quickly copied and pasted in various applications, without the need to retrieve the copied and pasted information from storage. In the "insert" function illustrated in FIG. 13, a file type stored on device memory, such as a stored picture, contact, video, etc. for example, may be retrieved and inserted, or attached, as shown above.

Figure 14D:
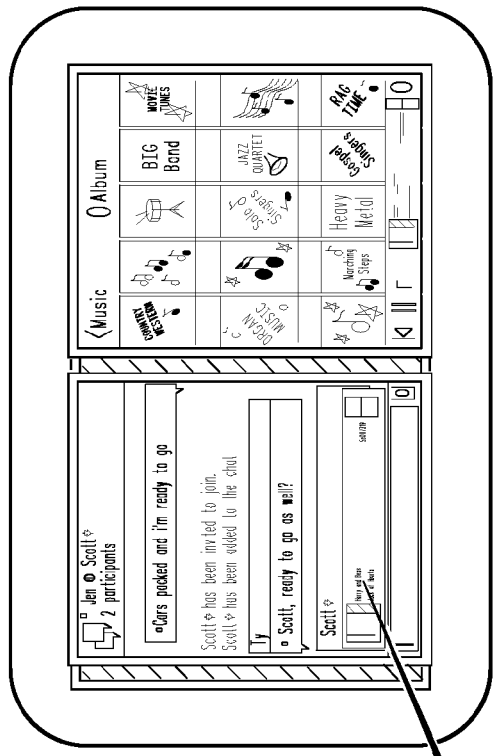
Figure 14C:
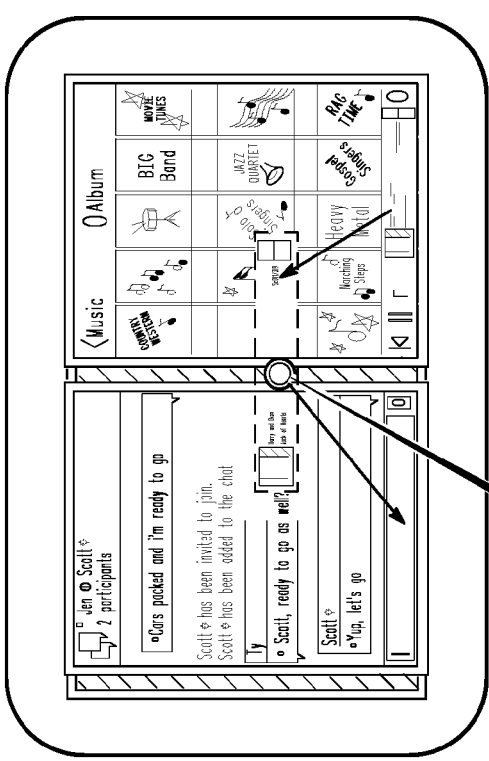

FIGS. 14*a-d* illustrate that the share function between two or more running applications maximized and simultaneously displayed in split screen mode viewing areas of the touch screen may be an "attach file" function that allows items such as pictures, photos, songs, video, locations, contacts, calendar events, etc. to be transferred from one maximized and displayed running application to another as attachments. Applications that might use the attach file function are varied and include applications such as email, instant messaging, BLACKBERRY® messenger (BBM), short message service (SMS), multimedia messaging service (MMS), etc. In FIG. 14*a*, following selection of a combined group representation two maximized and displayed running applications represented in the selected combined group representation are shown: an instant messaging (IM) application is displayed in the left split screen mode viewing area and a music application is displayed in the right split screen mode viewing area. The user in this example is chatting using an IM application and is able to use the share function existing between these two running applications while in the split screen mode to drag and drop songs from the music application into the IM application. This example of an attach file share function allows a user to send a song attachment from the music application to the IM application. In FIG. 14*b*, the user presses on a desired song in the right split screen mode viewing area of the touch screen, as indicated by the circle 1410, to select the song. Next, in FIG. 14*c*, the user drags the selected song into the IM application in the left split screen mode viewing area of the touch screen, as indicated by the dashed box 1420 surrounded the selected picture and the accompanying arrows in the drawing. The selected song is dragged in to the IM application displayed in the left split screen mode viewing area of the touch screen and released in the desired location 1430 in FIG. 14*d*, into a conversation of the IM application to send to a friend.

Another example of an attach file function shared between two maximized and simultaneously displayed running applications is illustrated in FIGS. 15*a-d*.

Figure 15C:
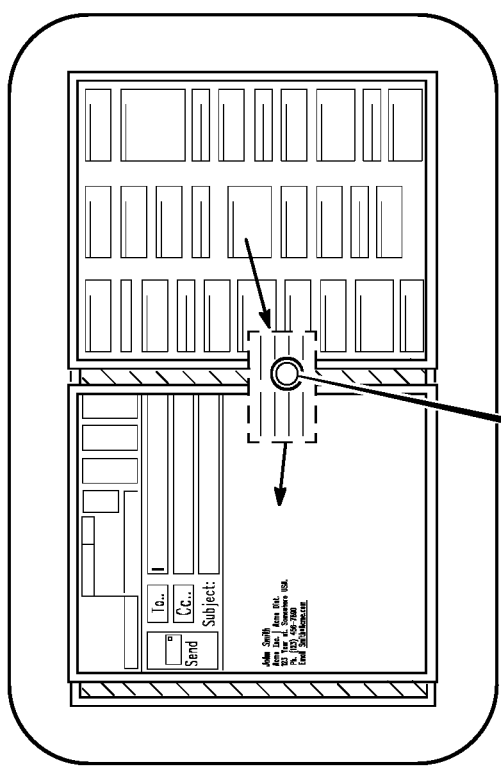
Figure 15D:
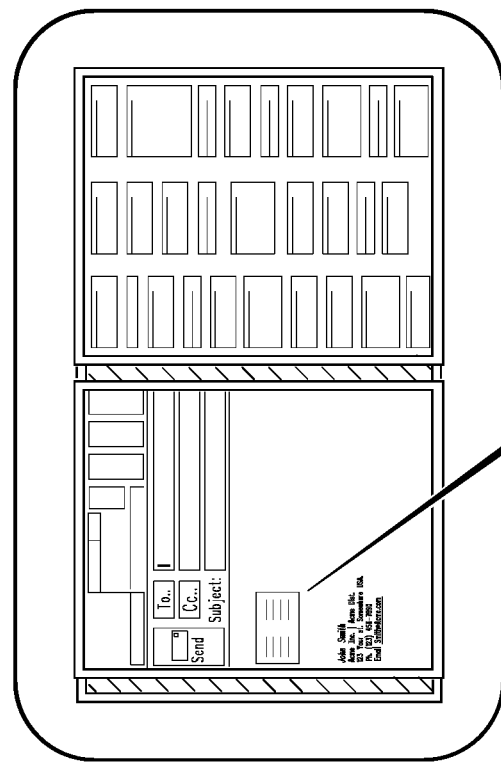

In FIG. 15*a*, following selection of a combined group representation two maximized and displayed running applications represented in the selected combined group representation are shown: an email application is displayed in the left split screen mode viewing area and an address book application is displayed in the right split screen mode viewing area. The user in this example is composing an email and uses the split screen mode to drag and drop contacts from the address book application into the body of an email in the email application. This example of an attach file share function allows a user to attach a contact from the address book application to the body of an email in the email application. In FIG. 15*b*, the user presses on a desired contact in the right split screen mode viewing area of the touch screen, as indicated by the circle 1510, to select the contact. Next, in FIG. 15*c*, the user drags the selected contact into the email application in the left split screen mode viewing area of the touch screen, as indicated by the dashed box 1520 surrounded the selected contact and the accompanying arrows in the drawing. The selected contact is dragged in to the email application displayed in the left split screen mode viewing area of the touch screen and released in the desired location into the email body 1530 in FIG. 15*d*, as shown.

Figure 16:
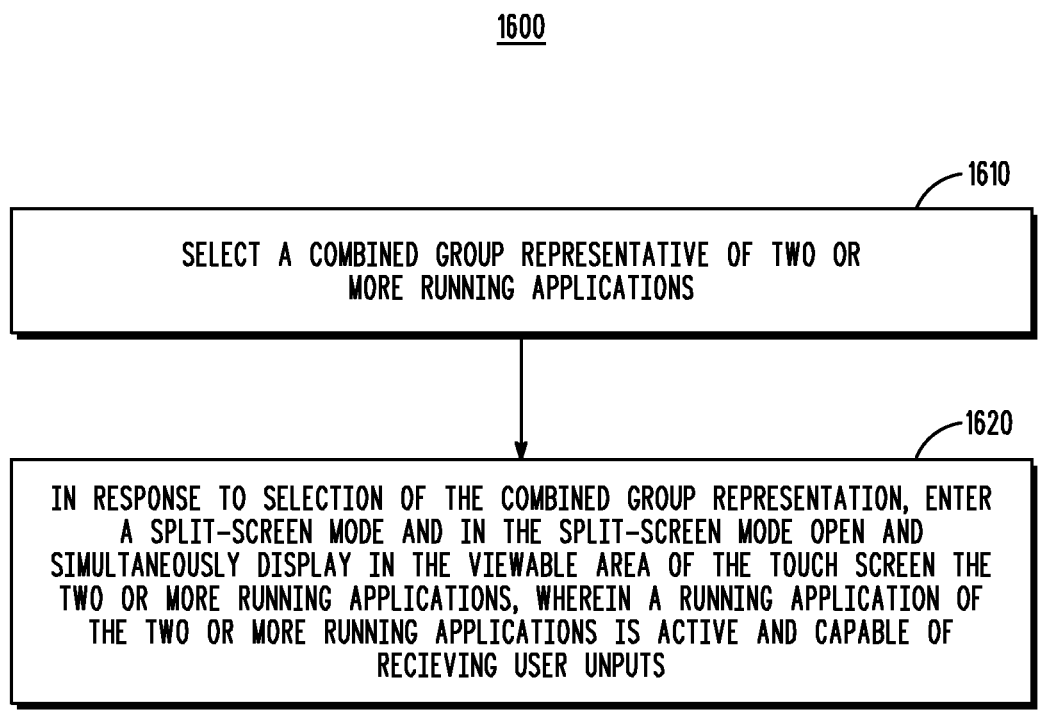
FIGS. 16 and 17 illustrate flows in accordance with various aspects of the present disclosure.

In accordance with the various examples described herein, a method flow 1600 is illustrated in FIG. 16. At Block 1610, a combined group representation representative of two or more running applications is selected. As discussed, the combined group representation comprises two or more application representations corresponding to minimized states of display of the two or more running applications that are grouped and displayed on a viewable area of the touch screen. At Block 1620, in response to selection of the combined group representation, a split screen mode is entered, and in the split screen mode the two or more running applications are opened and simultaneously displayed in the viewable area of the touch screen. One of the running applications thus displayed may be active and capable of receiving user inputs.

Figure 17:
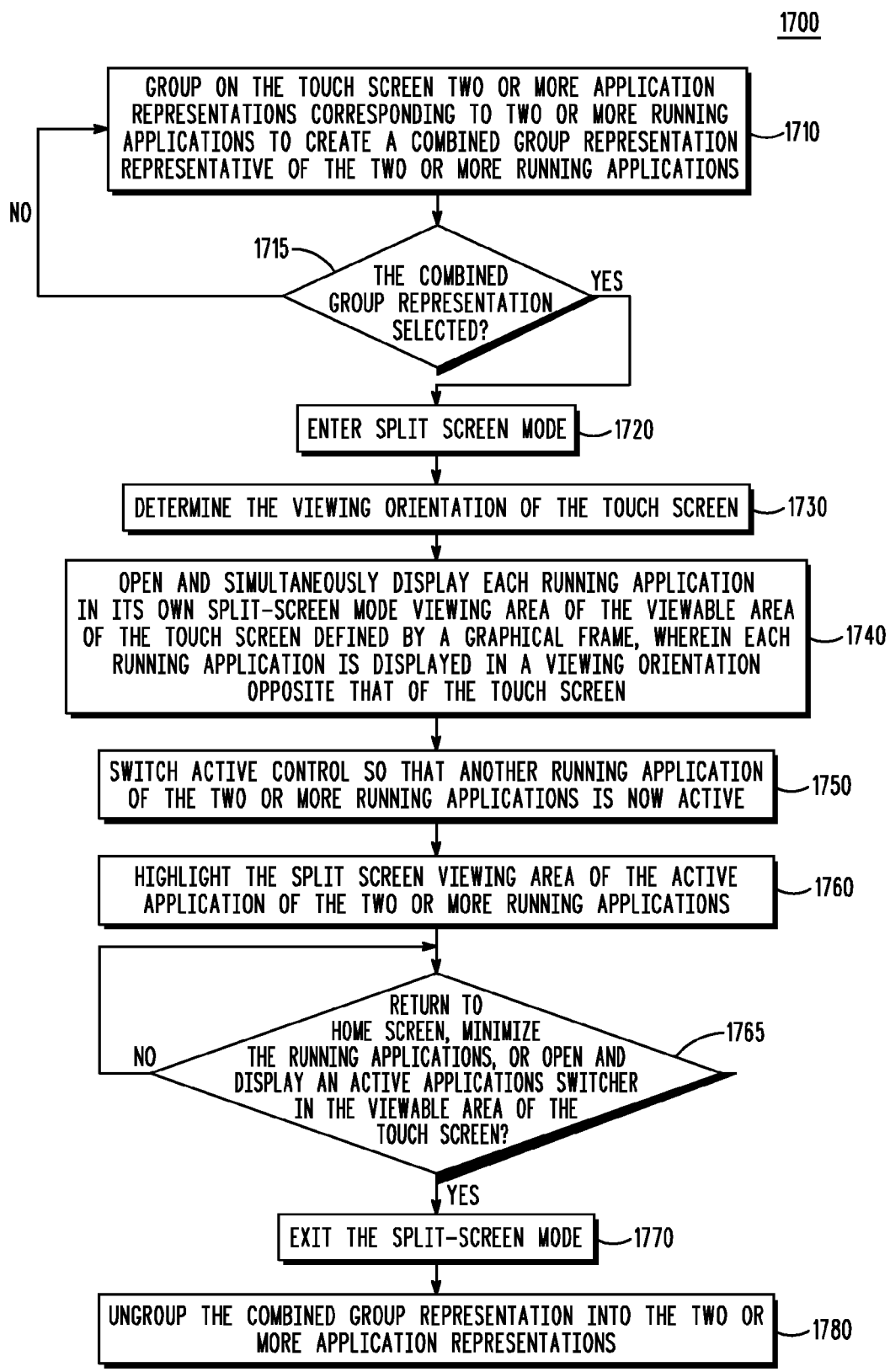

A more detailed flow in accordance with various examples described herein is provided by flow 1700 of FIG. 17. At Block 1710, two or more application representations, corresponding to two or more running applications, are grouped together on the touch screen to create a combined group representation representative of the two or more running applications. As discussed, the application representations may be an icon, a screen shot or other representation of the running application to which it corresponds. The combined group representation may be a group icon or be shown as stacked to convey that the combined group representation is comprised of two or more running applications. Creation of the combined group representation may involve overlaying on the touch screen the two or more application representations corresponding to the two or more running applications; such overlaying may be accomplished by dragging together the two or more application representations so that they are stacked on top of one another, as earlier described, or by pinching together the two or more application representations. Creation of the combined group representation may occur from a home screen displayed on the touch screen in which the two or more application representations are displayed.

Decision Block 1715 inquires into whether the created combined group representation has been selected. If yes, then the flow goes to Block 1720 to enter a split screen mode. The viewing orientation of the touch screen, such as portrait or landscape, is determined at Block 1730. Each running application represented in the combined group representation is opened and simultaneously displayed in its own split screen mode viewing area of the viewable area of the touch screen, and is displayed in a viewing orientation opposite that of the touch screen viewing orientation at Block 1740, (e.g., a portrait orientation having a 9:16 aspect ratio versus a landscape orientation having a 16:9 aspect ratio).

Optionally, active control of the displayed running applications in the split screen mode may be switched at Block 1750 if desired. While the application on top of the combined group representation stack may initially be active and highlighted to signify its status as the active application, this active control can be changed at any time desired, by the user selecting another application of the displayed applications to be active. Also optionally, at Block 1760, the current active running application may be highlighted as previously described to signify the current active application.

At Decision Block 1765, a number of actions may cause the split screen mode to be exited at Block 1770. Returning to the home screen, minimizing the maximized running applications, and/or opening and displaying an activate applications switcher in the viewable area of the touch screen may all cause the split screen mode to be exited at Block 1770. As discussed, exiting the split screen mode does not itself cause the combined group representation to be dismantled. This ungrouping occurs at Block 1780, and is an optional operation that may or may not occur. The ungrouping action taken in Block 1780 occurs by ungrouping (removing, separating, etc.) at least one of the application representations of the combined group representation. As discussed, this ungrouping may occur by a user pinching two or more applications icons away from each other, or by pinching the two minimized applications (screenshots) away from each other. It is noted that in the case of three or more running applications represented by a combined group representation, separating any two of the running application representations will have the effect of ungrouping the combined group representation without the need to separate all of the running application representations.

The order in which the optional operations represented in Blocks 1750, 1760, and 1780 occur is not predetermined or predefined, and these operations may occur in any order or not at all after occurrence of the operation of Block 1740. Thus, while the blocks comprising the methods are shown as occurring in a particular order, it will be appreciated by those skilled in the art that many of the blocks are interchangeable and can occur in different orders than that shown without materially affecting the end results of the methods.

The implementations of the present disclosure described above are intended to be examples only. Those of skill in the art can effect alterations, modifications and variations to the particular example embodiments herein without departing from the intended scope of the present disclosure. Moreover, selected features from one or more of the above-described example embodiments can be combined to create alternative example embodiments not explicitly described herein.

It will be appreciated that any module or component disclosed herein that executes instructions may include or otherwise have access to non-transient and tangible computer readable media such as storage media, computer storage media, or data storage devices (removable or non-removable) such as, for example, magnetic disks, optical disks, or tape data storage. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the server, any component of or related to the network, backend, etc., or accessible or connectable thereto. Any application or module herein described may be implemented using computer readable/executable instructions that may be stored or otherwise held by such computer readable media.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method for displaying maximized applications simultaneously on a touch screen of an electronic device, comprising:
    selecting a combined group representation representative of two or more applications, the combined group representation comprising two or more application representations that are grouped and displayed on a viewable area of the touch screen, the two or more application representations corresponding to two or more applications and the combined group representation created from a home screen displayed on the viewable area of the touch screen of the electronic device by a user in interaction with the touch screen;
    in response to selection of the combined group representation, entering a split screen mode and in the split screen mode running and simultaneously displaying in the viewable area of the touch screen the two or more running applications; and
    ungrouping the combined group representation representative of two or more applications into the two or more application representations and displaying in the viewable area of the touch screen the two or more application representations in response to separation of the grouped two or more application representations on the touch screen so that they are no longer grouped,
    wherein when the combined group representation is representative of four or more applications ungrouping any two of the four or more applications of the combined group representation ungroups each and every one of the four or more applications of the combined group representation into separate applications.

2. The method of claim 1, further comprising creating from the home screen the combined group representation by overlaying on the touch screen the two or more application representations corresponding to the two or more applications.

3. The method of claim 2, wherein overlaying on the touch screen the two or more application representations corresponding to the two or more applications further comprises one or more of the user pinching together the two or more application representations from the home screen to create the combined group representation and the user dragging together the two or more application representations from the home screen to create the combined group representation.

4. The method of claim 1, wherein simultaneously displaying the two or more running applications in the viewable area of the touch screen further comprises: displaying each running application of the two or more running applications in a corresponding split screen mode viewing area of the viewable area of the touch screen.

5. The method of claim 4, further comprising: highlighting the split screen mode viewing area of an active application with a highlighted portion of the viewable area of the touch screen distinct from the two or more split screen mode viewing areas in which the two or more running applications are displayed.

6. The method of claim 4, wherein the viewable area of the touch screen has a constant aspect ratio, the two or more running applications are first and second running applications, and first and second split screen mode viewing areas in which the first and second running applications are displayed each have an aspect ratio that is approximately converse that of the constant aspect ratio of the viewable area of the touch screen.

7. The method of claim 1, wherein the touch screen has first and second viewing orientations, the first viewing orientation converse to the second viewing orientation, and in response to selection of the combined group representation, the method further comprising:
  determining a viewing orientation of the touch screen to be the first viewing orientation; and
  running and simultaneously displaying in two or more corresponding split screen mode viewing areas of the viewable area of the touch screen the two or more running applications in the second viewing orientation.

8. The method of claim 1, wherein one running application is active and capable of receiving user inputs via the touch screen, the method further comprising:
  switching active control of the two or more running applications from a previous running application as active application to another running application of the two or more running applications as the active application.

9. The method of claim 1, further comprising:
  exiting the split screen mode of the touch screen, wherein exiting the split screen mode of the touch screen further comprises one or more of returning to the home screen displayed on the viewable area of the touch screen, minimizing to a minimized state of display the two or more running applications, and opening and displaying an activate applications switcher in the viewable area of the touch screen.

10. The method of claim 1, wherein the two or more applications of the combined group representation have a share function relationship formed upon creation of the combined group representation, and in response to selection of the combined group representation and simultaneous displaying in the viewable area of the touch screen of the two or more running applications in the split screen mode, the method further comprising:
  a share function of the share function relationship permitting sharing of items between the two or more running applications of the combined group representation in the split screen mode.

11. The method of claim 10, wherein the share function is a copy and paste function that provides for copying one or more items displayed by a first running application of the two or more running applications and pasting the one or more copied items into a second running application of the two or more running applications.

12. The method of claim 10, wherein the share function is an attach file function that provides for transmitting a file attachment of a first running application of the two or more running applications to a second running application of the two or more running applications.

13. The method of claim 10, wherein the share function is an insert function that provides for inserting one or more items displayed by a first running application into a second running application of the two or more running applications.

14. The method of claim 10, further comprising:
  ending the share function relationship formed between the first and second applications of the combined group representation upon ungrouping of the two or more application representations of the combined group representation.

15. The method of claim 1, further comprising:
  in a split screen mode of the electronic device running and simultaneously displaying in the viewable area of the touch screen first and second running applications in respective first and second split screen mode viewing areas, each of the first and second split screen mode viewing areas having an aspect ratio that is approximately converse that of a constant aspect ratio of the viewable area of the touch screen.

16. A non-transitory computer-readable medium comprising computer-executable instructions for performing the method of:
  selecting a combined group representation representative of two or more applications, the combined group representation comprising two or more application representations that are grouped and displayed on a viewable area of the touch screen, the two or more application representations corresponding to two or more applications and the combined group representation created from a home screen displayed on the viewable area of the touch screen of the electronic device by a user in interaction with the touch screen;
  in response to selection of the combined group representation, entering a split screen mode and in the split screen mode running and simultaneously displaying in the viewable area of the touch screen the two or more running applications; and
  ungrouping the combined group representation representative of two or more applications into the two or more application representations and displaying in the viewable area of the touch screen the two or more application representations in response to separation of the grouped two or more application representations on the touch screen so that they are no longer grouped,
  wherein when the combined group representation is representative of four or more applications ungrouping any two of the four or more applications of the combined group representation ungroups each and every one of the four or more applications of the combined group representation into separate applications.

17. An electronic device, comprising:
a touch-sensitive touch screen;
a processor coupled to the touch screen;
a memory coupled to and in cooperative arrangement with the processor, the processor and the memory configured to:
  select a combined group representation representative of two or more applications, the combined group representation comprising two or more application representations that are grouped and displayed on a viewable area of the touch screen, the two or more application representations corresponding to two or more applications and the combined group representation created from a home screen displayed on the viewable area of the touch-sensitive touch screen of the electronic device by a user in interaction with the touch screen of the electronic device;
  in response to selection of the combined group representation, enter a split screen mode and in the split screen mode run and simultaneously display in the viewable area of the touch screen the two or more running applications; and
  ungroup the combined group representation representative of two or more applications into the two or more application representations and display in the viewable area of the touch screen the two or more application representations in response to separation of the grouped two or more application representations on the touch screen so that they are no longer grouped,
  wherein when the combined group representation is representative of four or more applications ungrouping any two of the four or more applications of the combined group representation ungroups each and every one of the four or more applications of the combined group representation into separate applications.

18. The device of claim 17, wherein simultaneous display of the two or more running applications occurs in two or more corresponding split screen mode viewing areas of the viewable area of the touch screen.

19. The device of claim 18, the processor and memory further configured to: highlight the split screen mode viewing area of the active application with a highlighted portion of the viewable area of the touch screen distinct from the two or more split screen mode viewing areas in which the two or more running applications are displayed.

20. The device of claim 17, wherein the two or more application representations are two or more icons each corresponding to one of the two or more applications and wherein the combined group representation comprises the two or more icons grouped together and displayed on the touch screen.

21. The device of claim 17, wherein the touch screen has first and second viewing orientations and in response to selection of the combined group representation, the processor and the memory further configured to:
  determine the viewing orientation of the touch screen to be the first viewing orientation; and
  open and simultaneously display in two or more corresponding split screen mode viewing areas of the viewable area of the touch screen the two or more running applications in the second viewing orientation.

22. The device of claim 17, wherein one running application is active and capable of receiving user inputs via the touch screen and the processor and the memory are further configured to switch active control of the two or more running applications from a previous running application as the active application to another running application of the two or more running applications as the active application.

23. The device of claim 17, the processor and the memory further configured to exit the split screen mode of the touch screen upon the occurrence of one or more of return to the home screen displayed on the viewable area of the touch screen, minimize to a minimized state of display the two or more running applications, and open and display an activate applications switcher in the viewable area of the touch screen.

24. The device of claim 17, the processor and the memory further configured to ungroup the combined group representation representative of two or more running applications into the two or more application representations and display in the viewable area of the touch screen the two or more application representations in response to separation of the grouped two or more application representations on the touch screen so that they are no longer grouped.

25. The device of claim 17, the processor and the memory further configured to create a share function relationship between the two or more running applications represented by the combined group representation upon creation of the combined group representation, wherein the two or more running applications represented by the combined group representation share one or more share functions in the split screen mode.

26. The device of claim 25, wherein the one or more share functions comprise one or more of a copy and paste function, an attach file function and an insert function.

27. The device of claim 25, the processor and the memory further configured to end the share function relationship between the two or more running applications of the combined group representation when the combined group representation is ungrouped.

28. The electronic device of claim 17, the processor and the memory further configured to:
  in a split screen mode of the electronic device run and simultaneously display in the viewable area of the touch screen first and second running applications in respective first and second split screen mode viewing areas, each of the first and second split screen mode viewing areas having an aspect ratio that is approximately converse that of a constant aspect ratio of the viewable area of the touch screen.

* * * * *